US012598087B2

(12) United States Patent
Seki et al.

(10) Patent No.: US 12,598,087 B2
(45) Date of Patent: Apr. 7, 2026

(54) CRYPTOGRAPHIC ASSET BLOCKCHAIN PROCESSING APPARATUS, PROCESSING METHOD, PROCESSING SYSTEM, AND PROCESSING PROGRAM

(71) Applicant: KPMG AZSA LLC, Tokyo (JP)

(72) Inventors: Yoshinori Seki, Tokyo (JP); Junya Kondo, Tokyo (JP); Takeshi Sugihara, Tokyo (JP); Chiaki Kamijo, Tokyo (JP); Toshiyuki Abe, Tokyo (JP); Toshihiko Murata, Tokyo (JP); Masatake Toyota, Tokyo (JP); Jitendra Kumar Gambhir, Tokyo (JP); Goutham Thangaraj, Tokyo (JP); Astha Hareshbhai Jada, Tokyo (JP); Noorah Kazi, Tokyo (JP); Shingo Toda, Tokyo (JP); Tarun, Tokyo (JP)

(73) Assignee: KPMG AZSA LLC, Tokyo (JP)

( * ) Notice: Subject to any disclaimer, the term of this patent is extended or adjusted under 35 U.S.C. 154(b) by 492 days.

(21) Appl. No.: 18/041,981

(22) PCT Filed: Aug. 25, 2021

(86) PCT No.: PCT/JP2021/031092
§ 371 (c)(1),
(2) Date: Feb. 16, 2023

(87) PCT Pub. No.: WO2022/045168
PCT Pub. Date: Mar. 3, 2022

(65) Prior Publication Data
US 2023/0318856 A1    Oct. 5, 2023

(30) Foreign Application Priority Data
Aug. 31, 2020    (JP) ................................. 2020-145390

(51) Int. Cl.
*H04L 9/00*        (2022.01)
*G06F 16/27*       (2019.01)
(Continued)

(52) U.S. Cl.
CPC ................ *H04L 9/50* (2022.05); *G06F 16/27* (2019.01); *G06F 21/6227* (2013.01); *G06F 21/64* (2013.01); *G06Q 20/401* (2013.01)

(58) Field of Classification Search
CPC ....... H04L 9/50; G06F 16/27; G06F 21/6227; G06F 2221/2101; G06F 16/9024;
(Continued)

(56) References Cited

U.S. PATENT DOCUMENTS 10,504,179 B1    12/2019  McGuire et al.
11,068,473 B1     7/2021  Wyner et al.
(Continued)

FOREIGN PATENT DOCUMENTS

CN      108595720 A      9/2018
JP      2018-525729 A    9/2018
(Continued)

OTHER PUBLICATIONS

An Office Action; "Notice of Reasons for Refusal," mailed by the Japanese Patent Office on Feb. 19, 2024, which corresponds to Japanese Patent Application No. 2020-145390 and is related to U.S. Appl. No. 18/041,981; with English language translation.
(Continued)

*Primary Examiner* — Shaqueal D Wade-Wright
(74) *Attorney, Agent, or Firm* — Studebaker Brackett PLLC

(57)        ABSTRACT

In interpreting a data record in a blockchain of a certain cryptographic asset, it is usually necessary to use the API of the node software provided by the developer of the software that devises the implementation method. However, since an
(Continued)

input/output method of the API also differs depending on the implementation method, it is difficult to collect and analyze blockchain data of cryptographic assets according to a plurality of different implementation methods. The present invention provides a cryptographic asset blockchain processing apparatus or the like that collects blockchain data generated by a plurality of different implementation methods, converts the data into data that can be analyzed, and processes a transaction content such as a quantity, a unit price, and a partner of a transaction cryptographic asset into a standardized format, thereby improving convenience of analysis of a large amount of data for an accounting audit or the like.

18 Claims, 28 Drawing Sheets

(51) Int. Cl.
| | | |
|---|---|---|
| G06F 21/62 | (2013.01) | |
| G06F 21/64 | (2013.01) | |
| G06Q 20/40 | (2012.01) | |

(58) Field of Classification Search
CPC .. G06F 21/64; G06Q 20/3829; G06Q 20/065; G06Q 20/382; G06Q 20/223; G06Q 20/3678; G06Q 20/3827; G06Q 20/389; G06Q 20/401
See application file for complete search history.

(56) References Cited

U.S. PATENT DOCUMENTS

| | | | | |
|---|---|---|---|---|
| 11,100,510 | B1 | 8/2021 | Wyner et al. | |
| 2012/0109830 | A1* | 5/2012 | Vogel | G06Q 30/06 705/64 |
| 2017/0017936 | A1 | 1/2017 | Bisikalo et al. | |
| 2017/0017954 | A1 | 1/2017 | McDonough et al. | |
| 2017/0017955 | A1 | 1/2017 | Stern et al. | |
| 2017/0046689 | A1 | 2/2017 | Lohe et al. | |
| 2017/0048209 | A1 | 2/2017 | Lohe et al. | |
| 2017/0048234 | A1 | 2/2017 | Lohe et al. | |
| 2017/0048235 | A1 | 2/2017 | Lohe et al. | |
| 2017/0083907 | A1 | 3/2017 | McDonough et al. | |
| 2017/0085545 | A1 | 3/2017 | Lohe et al. | |
| 2017/0085555 | A1 | 3/2017 | Bisikalo et al. | |
| 2017/0091756 | A1 | 3/2017 | Stern et al. | |
| 2017/0109735 | A1 | 4/2017 | Sheng et al. | |
| 2017/0221052 | A1 | 8/2017 | Sheng et al. | |
| 2017/0228731 | A1 | 8/2017 | Sheng et al. | |
| 2018/0176013 | A1 | 6/2018 | Cheng et al. | |
| 2018/0191503 | A1 | 7/2018 | Alwar et al. | |
| 2018/0262341 | A1 | 9/2018 | Cheng et al. | |
| 2018/0367316 | A1 | 12/2018 | Cheng et al. | |
| 2019/0005469 | A1 | 1/2019 | Dhupkar et al. | |
| 2019/0188699 | A1 | 6/2019 | Thibodeau et al. | |
| 2019/0188700 | A1 | 6/2019 | August et al. | |
| 2019/0188701 | A1 | 6/2019 | Parsons et al. | |
| 2019/0280864 | A1 | 9/2019 | Cheng et al. | |
| 2019/0303623 | A1* | 10/2019 | Reddy | G06F 8/71 |
| 2019/0347663 | A1* | 11/2019 | Li | H04L 67/104 |
| 2019/0356471 | A1* | 11/2019 | Vaughn | H04L 9/3247 |
| 2020/0074563 | A1* | 3/2020 | Grosset | G06Q 40/12 |
| 2020/0151167 | A1* | 5/2020 | Shi | G06Q 20/065 |
| 2020/0294041 | A1* | 9/2020 | Ocher | G06Q 20/3829 |
| 2021/0182773 | A1* | 6/2021 | Padmanabhan | H04L 9/3239 |
| 2021/0266167 | A1 | 8/2021 | Lohe et al. | |
| 2021/0342825 | A1 | 11/2021 | Le Calvez et al. | |
| 2021/0382875 | A1 | 12/2021 | Wyner et al. | |
| 2022/0027900 | A1* | 1/2022 | Suh | G06Q 20/3829 |
| 2022/0067738 | A1* | 3/2022 | Fang | G06Q 20/389 |
| 2022/0147974 | A1* | 5/2022 | Law | G06F 21/34 |
| 2022/0321340 | A1 | 10/2022 | Tsitrin et al. | |
| 2022/0327525 | A1 | 10/2022 | Tsitrin et al. | |
| 2023/0084490 | A1* | 3/2023 | Mee | H04L 9/3247 705/69 |

FOREIGN PATENT DOCUMENTS

| | | |
|---|---|---|
| WO | 2020/153688 A1 | 7/2020 |
| WO | 2021/221795 A1 | 11/2021 |
| WO | 2021/222690 A1 | 11/2021 |

OTHER PUBLICATIONS

Ethereum Blockchain Parser, [online], Jul. 20, 2020, pp. 1-9, [Search date: Feb. 14, 2024], Internet < URL: https://web.archive.org/web/20200720110342/https://github.com/alex-miller-0/Ethereum_Blockchain_Parser#4-aggregate-data-and-analyze.
International Search Report issued in PCT/JP2021/031092; mailed Nov. 2, 2021.
Blockchair, "Blockchain Explorer, Analytics and Web Services," Searched on Aug. 27, 2020 <URL: https://blockchair.com>.
Ethereum Blockchain Parser, GitHub, [online], Jun. 11, 2018, <URL: https://web.archive.org/web/20180611162129/https://github.com/alex-miller-0/Ethereum_Blockchain_Parser>.
The extended European search report issued by the European Patent Office on Dec. 8, 2023, which corresponds to European Patent Application No. 21861592.0-1218 and is related to U.S. Appl. No. 18/041,981.
Balaskas Anastasios et al., "Analytical Tools for Blockchain: Review, Taxonomy and Open Challenges", 2018 International Conference on Cyber Security and Protection of Digital Services (Cyber Security), IEEE, Jun. 11, 2018, pp. 1-8, XP033463399, doi: 10.1109/CYBERSECPODS.2018.8560672.
Kalodner, H. et al., "BlockSci: Design and applications of a blockchain analysis platform", Proceedings of the 29th USENIX Security Symposium, Aug. 12-14, 2020, pp. 2721-2738, USENIX Association.
Yousaf, H. et al., "Tracing Transactions Across Cryptocurrency Ledgers", USENIX Security '19 Open Access Videos Sponsored by King Abdullah University of Science and Technology (KAUST), Aug. 14-16, 2019, Santa Clara, CA, USA, pp. 837-850.
Framewala, A. et al., "Blockchain Analysis Tool For Monitoring Coin Flow", 2020 Seventh International Conference on Software Defined Systems (SDS), Apr. 20-23, 2020, Paris, France, pp. 196-201.
Examination report No. 1 mailed by the Australian Patent Office on Dec. 6, 2023, which corresponds to Australian Patent Application 2021331139 and is related to U.S. Appl. No. 18/041,981.

* cited by examiner

FIG. 7

General info

80233  —  80234  —  80235

Hash    0000000000002862a0885ec35cd86b8d95b1e1c0ba182845198b2a5b904d1dfb3e

Mined on 2010-09-17 07:13 (10 years ago)

| | |
|---|---|
| Miner | Unknown |
| Coinbase data | ☐☐☐[☐☐☐ |
| | USD ◯ BTC |
| Transaction count | 2 |
| Fee per kB | 0.00000000 BTC |
| Witness tx count | 0 |
| Fee per kWU | 0.00000000 BTC |
| Input count | 2 |
| Output count | 3 |
| Input total | 86.70000000 BTC |
| Output total | 136.70000000 BTC |
| Fee total | 0.00000000 BTC |
| Coindays destroyed | 0.00 |
| Generation | 50.00000000 BTC |
| Reward | 50.00000000 BTC |

Technical details

| | |
|---|---|
| Difficulty | 712.8848645521 |
| Size | 473 |
| Weight (weight units) | 1,892 |
| Stripped size | 473 |
| Version | $1_{10}$  $1_{16}$ |
| Version [bits] | 00000000000000000000000000000001$_2$ |
| Median time | 2010-09-17 06:47:21 |
| Merkle root | 72☐☐☐☐☐☐68 |
| For developers | API docs |
| Alternative explorers | BTC |

Click to see more ⤓

FIG. 8

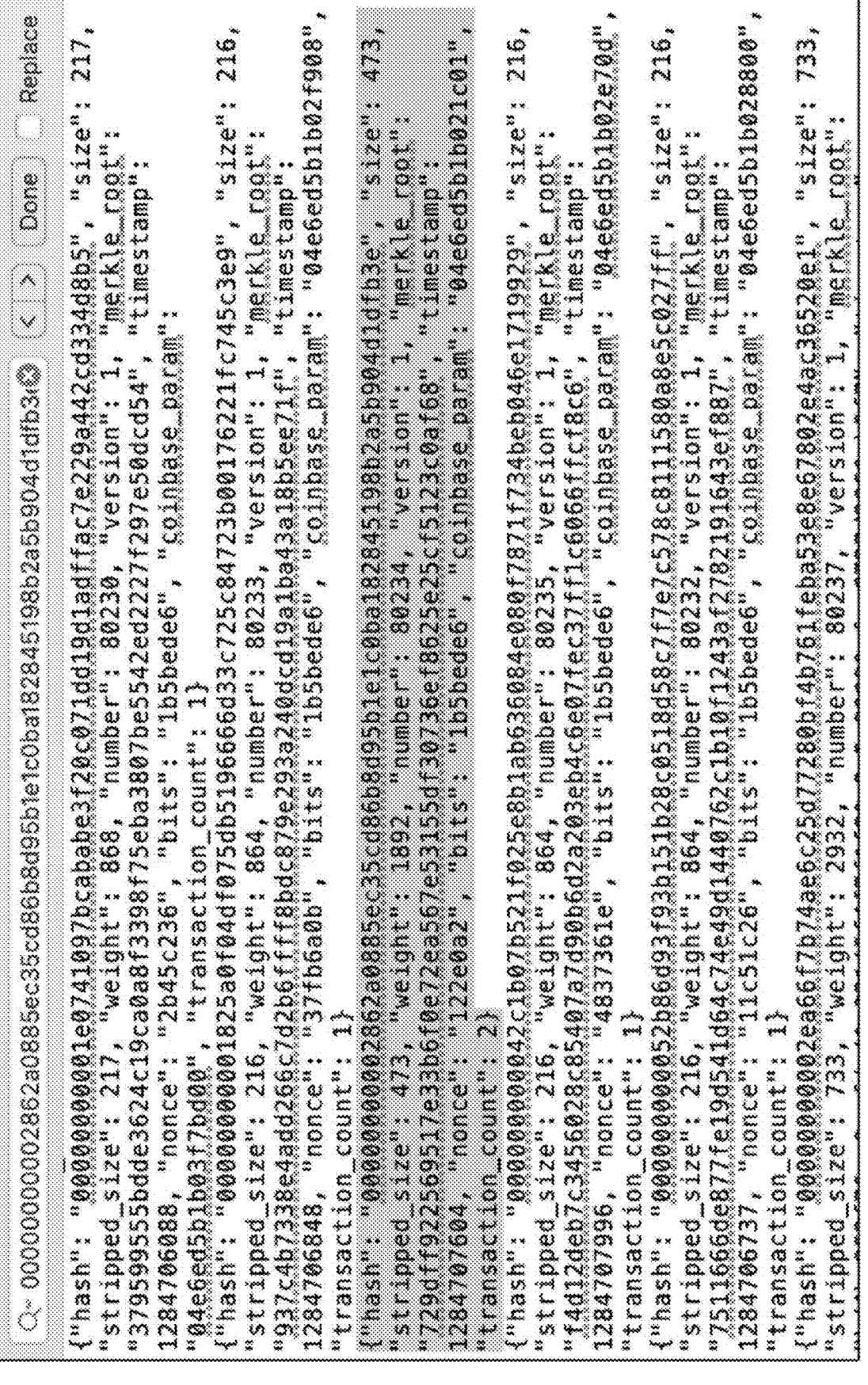

Q∨ 000000000002862a0085ec35cd86b8d95b1e1c0ba18284519802a5b904d1dfb3⬤  ‹ › Done ⬤ Replace {"hash": "00000000001e0741097bcababe3f20c071dd19d1adffac7e229a442cd334d0b5", "size": 217,
"stripped_size": 217, "weight": 868, "number": 80230, "version": 1, "merkle_root":
"37959955bdde3624c19ca0a8f3398f75eba3807be5542ed2227f297e50cd54", "timestamp":
1284706088, "nonce": "2b45c236", "bits": "1b5bede6", "coinbase_param": 1)
"04e6ed5b1b03f7bd00", "transaction_count": 1}
{"hash": "00000000001825a0f04df075db5196666d33c725c84723b00176221fc745c3e9", "size": 216,
"stripped_size": 216, "weight": 864, "number": 80233, "version": 1, "merkle_root":
"937c4b7338e4add266c7d2b6fff8bdc879e293a240dcd19a1ba43a18b5ee57f", "timestamp":
1284706848, "nonce": "37fb6a0b", "bits": "1b5bede6", "coinbase_param": "04e6ed5b1b02f908",
"transaction_count": 1}
{"hash": "00000000002862a0085ec35cd86b8d95b1e1c0ba18284519802a5b904d1df3e", "size": 473,
"stripped_size": 473, "weight": 1892, "number": 80234, "version": 1, "merkle_root":
"729dff9225b9517e33b6f0e72ea567e53155df3073ef8625c25cf5123c0af68", "timestamp":
1284707604, "nonce": "122e0a2", "bits": "1b5bede6", "coinbase_param": "04e6ed5b1b021c01",
"transaction_count": 2}
{"hash": "00000000042c1b07b521f025e8b1ab636084e080f7871f734beb046e1719929", "size": 216,
"stripped_size": 216, "weight": 864, "number": 80235, "version": 1, "merkle_root":
"f4d12deb7c3456028c85407a7d90b6d2a203eb4c6e07fec37ff1c6066ffcf8c6", "timestamp":
1284707996, "nonce": "48373b1e", "bits": "1b5bede6", "coinbase_param": "04e6ed5b1b02e70d",
"transaction_count": 1}
{"hash": "00000000052b86d93f93b151b28c0518d58c7f7e7c578c811580a0e5c027ff", "size": 216,
"stripped_size": 216, "weight": 864, "number": 80232, "version": 1, "merkle_root":
"751166de877fe19d541d64c74e49d14440762c1b10f12243af278219164ef887", "timestamp":
1284706737, "nonce": "11c51c26", "bits": "1b5bede6", "coinbase_param": "04e6ed5b1b028800",
"transaction_count": 1}
{"hash": "00000000002ea66f7b74ae6c25d77280bf4b761febs53e86780e4ac3652e1", "size": 733,
"stripped_size": 733, "weight": 2932, "number": 80237, "version": 1, "merkle_root":

FIG. 9

General info

| | |
|---|---|
| Hash(txid) | bfab06e145dabc5f4ba6445bd1b0ce78109d433177e5971ef5dcd86857d8c669 |
| Block id | 80234    560210 confirmation |
| Time(UTC) | 2010-09-17 07:13 (10 years ago) |
| | USD ◯ BTC |
| PDF receipt | |
| Input total | 86.70000000 BTC    Output total    86.70000000 BTC |
| Fee | 0.00000000 BTC    Fee per byte    0 satoshi |
| Replace-by-fee(RBF)enabled? | NO    Fee per vbyte    0 satoshi |

Technical details

| | |
|---|---|
| Input count/Output count | 1/2 |
| Size | 257 |
| Coindays destroyed | 0.00 |
| For developers | API docs    Raw tx |
| Alternative explorers | BTC |
| Click to see more → | |

Senders

← 86.70000000 BTC    1FUxxitof725tgkqXkvDZ7Rba5TokoAiJ1

Recipients

1G59hhQV6yqt2HtrBduky2wTeRCMiE4R8m    86.65000000 BTC ↑

16ia5BU9YuEeYhwAY9iueDnozfxsVSemhY    0.05000000 BTC ↑

*FIG. 10*

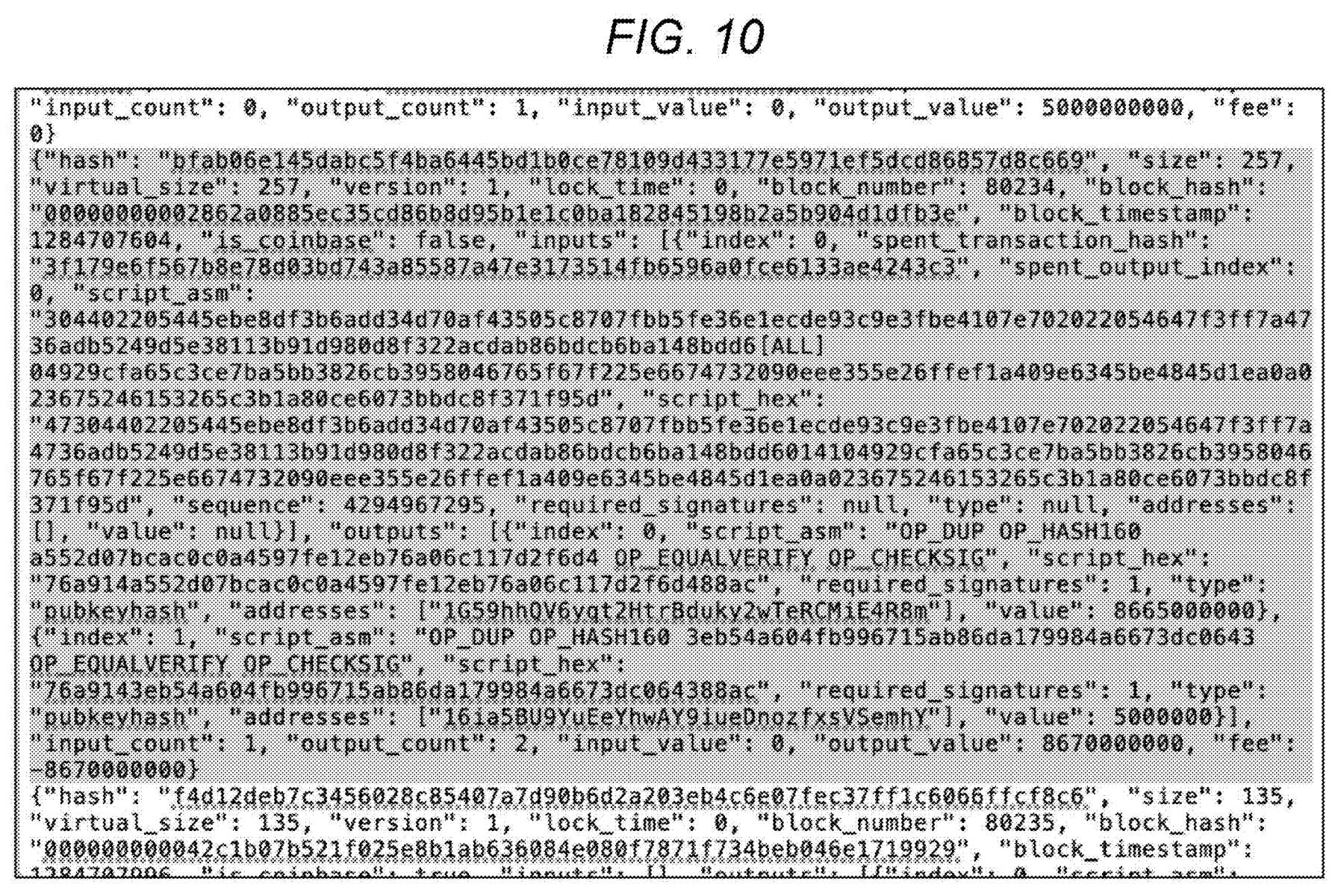

"input_count": 0, "output_count": 1, "input_value": 0, "output_value": 5000000000, "fee": 0}
{"hash": "bfab06e145dabc5f4ba6445bd1b0ce78109d43317fe5971ef5dcd86857d8c669", "size": 257,
"virtual_size": 257, "version": 1, "lock_time": 0, "block_number": 80234, "block_hash":
"00000000002862a0885ec35cd86b8d95b1e1c0ba18284519b2a5b904d1fb3e", "block_timestamp":
1284707604, "is_coinbase": false, "inputs": [{"index": 0, "spent_transaction_hash":
"3f179e6f567b8e78d03bd743a8587a47e3173514fb6596a0fce133ae4243c3", "spent_output_index":
0, "script_asm":
"304402205445ebe8df3b6add34d70af43505c8707fbb5fe36e1ecde93c9e3fbe4107e702022054647f3ff7a47
36adb5249d5e38113b91d980d8f322acdab86bdcb6ba148bdd6[ALL]
04929cfa65c3ce7ba5bb3826cb3958046765f67f225e66747320990eee355e26ffef1a409e6345be4845d1ea0a0
23675246153265c3b1a80ce6073bbdc8f371f95d", "script_hex":
"473044022054445ebe8df3b6add34d70af43505c8707fbb5fe36e1ecde93c9e3fbe4107e702022054647f3ff7a
4736adb5249d5e38113b91d980d8f322acdab86bdcb6ba148bdd60141049 29cfa65c3ce7ba5bb3826cb3958046
765f67f225e66747320990eee355e26ffef1a409e6345be4845d1ea0a023675246153265c3b1a80ce6073bbdc8f
371f95d", "sequence": 4294967295, "required_signatures": null, "type": null, "addresses":
[], "value": null}], "outputs": [{"index": 0, "script_asm": "OP_DUP OP_HASH160
a552d07bcac0c0a4597fe12eb76a06c117d2f6d4 OP_EQUALVERIFY OP_CHECKSIG", "script_hex":
"76a914a552d07bcac0c0a4597fe12eb76a06c117d2f6d488ac", "required_signatures": 1, "type":
"pubkeyhash", "addresses": ["1G59h0V6yqt2HtrBduky2wTeRCMiE4R8m"], "value": 8665000000},
{"index": 1, "script_asm": "OP_DUP OP_HASH160 3eb54a604fb996715ab86da17984a6673dc0643
OP_EQUALVERIFY OP_CHECKSIG", "script_hex":
"76a9143eb54a604fb996715ab86da17984a6673dc064388ac", "required_signatures": 1, "type":
"pubkeyhash", "addresses": ["161a5BU9YuEeYhwAY9iueDnozfxsVSemhY"], "value": 5000000}],
"input_count": 1, "output_count": 2, "input_value": 0, "output_value": 8670000000, "fee":
8670000000}
{"hash": "f4d12deb7c34560 28c854 07a7d90b6d2a203eb4c6e07fec37ff1c6066ffcf8c6", "size": 135,
"virtual_size": 135, "version": 1, "lock_time": 0, "block_number": 80235, "block_hash":
"00000000042c1b07b521f025e8b1ab636084e080f7871f734beb046e1719929", "block_timestamp":
1284707606,

FIG. 12 part-00140-71b80e44-ecb8-4f4a-b6fc-

| hash | size | stripped size | weight | number | version | merkle_root |
|---|---|---|---|---|---|---|
| 00000000e5a228a316fca939aec2133101907621177de18553e8f11edccf7cc8ed | 215 | 215 | 860 | 30097 | 1 | 9a3ffbc84acba26asbe0f6eb2f9ec5f02 |
| 00000000fd29433faccafc54dc09e0c7187cd9a7b5a59f6e2a5a690597cc7e6b | 215 | 215 | 860 | 30098 | 1 | d71689cccb6ac65723eed3a3316f2f8 |
| 00000000f2461b4eeab0b3d3563dde7cee13ate2200a5c1aa789f984223b6bdd31 | 215 | 215 | 860 | 30099 | 1 | e62d9d19bc9df4fa6c74c40a5fcdf77 |
| 000000003Befdd1423b6afb270e19b772a7e42e3f8ecc612a729f83e61d8258eda09 | 216 | 216 | 864 | 30101 | 1 | 5d1cff5353c3bfbb80cc5a9ecaaa2aa |
| 0000000089e62cf373fcf7b4f2f562e0bdb1d60ac87733d98cbbf79ec7adc88fc0 | 216 | 216 | 864 | 30100 | 1 | a11527350177526 4ae60b1a1a7d67 |
| 0000000f78d3b36f077e0f6f8ce957bca89b7827cf0be9cbb2d771b9db53cf0a | 215 | 215 | 860 | 30102 | 1 | 0b4e78a6bsc193e42e8fafe6f5e79ee |
| 0000000068c0e6f87168ef3c31144d2c7ef28162240c1e482f4a58ecfe90ff5777 | 1369 | 1369 | 5476 | 30104 | 1 | 97f54127cf4979d23fff0ecfbbe5bce099 |
| 0000000ef71c340ff901da0a0494dde7600dc1161f43c9adf06dca14f40bf | 215 | 215 | 860 | 30103 | 1 | 831ed10df9faaa7c84433f944becb9 |
| 0000000211269fee8fsec76a0c10b0d64cbf480 46e98c2f9b1e43fccacc8f683592 | 215 | 215 | 860 | 30105 | 1 | 9fb9a96d4f6544b4 7ee243b103ae46 |
| 000000dfd3c916bdsffb8c9c528b3844f0b0abd52a27f5ce7833e4ed8e9a2122f34 | 218 | 218 | 864 | 30110 | 1 | 170670 2d9fafda4d68f9879c84f1011 |
| 00000000317275fa512ccef94c00d44cc5c938f415486ce192d4f298ab09022a5 | 215 | 215 | 860 | 30109 | 1 | 549198ed3c051c20b1362d9d72dcf |
| 0000000616d11904281eaad98f92cb46b3d3fce8408f8363225836635daa100ea | 215 | 215 | 860 | 30107 | 1 | 0b463d5a5dff98ea57a321d86f9222d |
| 0000000fa0cbc827556f0ee0a769b29f86eefcdssa520cf2c6d06371d772968f6ab4081 | 216 | 216 | 864 | 30108 | 1 | cbeff31be43408fa a3abf8e7a6c89a8 |
| 0000000ef03edfbb7db4405cf616fb71230659 7ef6edabe6dcd4f3f537e868d6c7 | 215 | 215 | 860 | 30106 | 1 | dbeefcca68c68f7241a63f6642ef8ee7 |
| 0000009f28e62f3ec0338a2a83bc43f4f6bafe172165550f3ae73fecddf958 | 216 | 216 | 864 | 30111 | 1 | b83840719a6fa9f9efc803286ba3af1 |
| 0000000e1e1153fb5afc82e788118df0114029d47accad6afec3532b7fa18fefo6fd | 215 | 215 | 860 | 30113 | 1 | c60260fe2421d0c49ec535571bc907 |
| 0000000df0fb3b0bd048c2f8f002f26ec57ef3fee f4e40afba124f89458a990dfaa7b31 | 215 | 215 | 860 | 30112 | 1 | d87f83d554d7e48f7103cbf9493902cd |
| 0000000d4ac386d775facc3cf736a38f6a5e19f28f2aad8f6a1a8701745856b1aad4 | 215 | 215 | 860 | 30114 | 1 | 1f8eeb9752caf8185077bafa4016a662 |
| 0000002c6e0a710156799c1336690134c4e7c29f6a5e856d8c4fcff9465030 | 215 | 215 | 860 | 30118 | 1 | 79f5cfd6ak35b98e9c9ae324a9babac |
| 0000002fb46a15c3db99b4279853c8b8113b9fbb4b95b01f3c360ecbf0228 | 215 | 215 | 860 | 30115 | 1 | 610889a4f9191cdf40e34d152535d33 |
| 0000006e647444d6e63fdbfb44cce74bf6223d0acad4d9ce43df7686539a04c0 | 216 | 216 | 864 | 30120 | 1 | 661b0877eadcf75891 1ed8573422694 |
| 00000021e89128f06935dfff95396f28f35f440f4206c9803579234700f6287 | 216 | 216 | 864 | 30117 | 1 | 56f73b6047f8ac88fdabfdf9093037392 |
| 00000000182354763ef6f9afe0357c91c2588f65cfb11bea03e578d3fd286bd5c30df8d6 | 215 | 215 | 860 | 30116 | 1 | bf2081a4ae73e16442474af4364261 |

*FIG. 13*

Level 1

| block | | |
|---|---|---|
| | hash | string |
| | size | bigint |
| | stripped_size | string |
| | weight | string |
| | number | bigint |
| | version | bigint |
| | merkle_root | string |
| | timestamp | bigint |
| | nonce | string |
| | bits | string |
| | coinbase_param | string |
| | transaction_count | bigint |
| | end_block | bigint |
| | start_block | bigint |

Level 2

| block | | |
|---|---|---|
| | hash | string |
| | size | bigint |
| | stripped_size | string |
| | weight | string |
| | number | bigint |
| | version | bigint |
| | merkle_root | string |
| | timestamp | bigint |
| | nonce | string |
| | bits | string |
| | coinbase_param | string |
| | transaction_count | bigint |
| | end_block | bigint |
| | start_block | bigint |
| | year | string |
| | month | string |
| | day | string |

Level 1

| blocks | | |
|---|---|---|
| | number | bigint |
| | hash | string |
| | parent_hash | string |
| | nonce | string |
| | sha3_uncles | string |
| | logs_bloom | string |
| | transactions_root | string |
| | state_root | string |
| | receipts_root | string |
| | miner | string |
| | difficulty | decimal |
| | total_difficulty | decimal |
| | size | bigint |
| | extra_data | string |
| | gas_limit | bigint |
| | gas_used | bigint |
| | timestamp | bigint |
| | transaction_count | bigint |
| | start_block | string |
| | end_block | string |

Level 2

| blocks | | |
|---|---|---|
| | number | bigint |
| | hash | string |
| | parent_hash | string |
| | nonce | string |
| | sha3_uncles | string |
| | logs_bloom | string |
| | transactions_root | string |
| | state_root | string |
| | receipts_root | string |
| | miner | string |
| | difficulty | bigint |
| | total_difficulty | bigint |
| | size | bigint |
| | extra_data | string |
| | gas_limit | bigint |
| | gas_used | bigint |
| | timestamp | bigint |
| | transaction_count | bigint |
| | end_block | bigint |
| | start_block | bigint |
| | year | string |
| | month | string |
| | day | string |

*FIG. 17*

Level 1

| token_transfers | | |
|---|---|---|
| | token_address | string |
| | from_address | string |
| | to_address | string |
| | value | decimal(38 |
| | transaction_hash | string |
| | log_index | bigint |
| | block_number | bigint |
| | start_block | string |
| | end_block | string |

| tokens | | |
|---|---|---|
| | address | string |
| | symbol | string |
| | name | string |
| | decimals | string |
| | total_supply | string |
| | start_block | string |
| | end_block | string |

Level 2

| token_transfers | | |
|---|---|---|
| | token_address | string |
| | from_address | string |
| | to_address | string |
| | value | decimal(38 |
| | transaction_hash | string |
| | log_index | bigint |
| | block_number | bigint |
| | symbol | string |
| | name | string |
| | decimals | bigint |
| | total_supply | bigint |
| | year | string |
| | month | string |
| | day | string |

*FIG. 18*

| Level 1 | | |
|---|---|---|
| block_number | string | |
| transaction_hash | string | |
| transaction_index | string | |
| from_address | string | |
| to_address | string | |
| value | string | |
| input | string | |
| output | string | |
| trace_type | string | |
| call_type | string | |
| reward_type | string | |
| gas | string | traces |
| gas_used | string | |
| subtraces | string | |
| trace_address | string | |
| error | string | |
| start_block | string | |
| end_block | string | |

| Level 2 | | |
|---|---|---|
| block_number | bigint | |
| transaction_hash | string | |
| transaction_index | bigint | |
| from_address | string | |
| to_address | string | |
| value | decimal(38,0) | |
| input | string | |
| output | string | |
| trace_type | string | |
| call_type | string | |
| reward_type | string | |
| gas | decimal(38,0) | internal_transactions |
| gas_used | decimal(38,0) | |
| subtraces | bigint | |
| trace_address | string | |
| error | string | |
| status | bigint | |
| timestamp | bigint | |
| year | string | |
| month | string | |
| day | string | |

*FIG. 19*

Level 1

| transactions | | |
|---|---|---|
| | hash | string |
| | nonce | bigint |
| | block_hash | string |
| | block_number | bigint |
| | transaction_index | bigint |
| | from_address | string |
| | to_address | string |
| | value | decimal(38 |
| | gas | bigint |
| | gas_price | bigint |
| | input | string |
| | start_block | string |
| | end_block | string |

| receipts | | |
|---|---|---|
| | transaction_hash | string |
| | transaction_index | bigint |
| | block_hash | string |
| | block_number | bigint |
| | cumulative_gas_used | bigint |
| | gas_used | bigint |
| | contract_address | string |
| | root | string |
| | status | bigint |
| | start_block | string |
| | end_block | string |

Level 2

| transactions | | |
|---|---|---|
| | block_number | bigint |
| | block_hash | string |
| | nonce | bigint |
| | hash | string |
| | transaction_index | bigint |
| | from_address | string |
| | to_address | string |
| | value | decimal(38,0) |
| | gas | decimal(38,0) |
| | gas_price | decimal(38,0) |
| | gas_used | decimal(38,0) |
| | status | bigint |
| | timestamp | bigint |
| | year | string |
| | month | string |
| | day | string |

FIG. 20

| Level 1 | | |
|---|---|---|

| | address | string |
|---|---|---|
| | bytecode | string |
| | function_sighashes | string |
| contracts | is_erc20 | boolean |
| | is_erc721 | boolean |
| | start_block | string |
| | end_block | string |

| | log_index | bigint |
|---|---|---|
| | transaction_hash | string |
| | transaction_index | bigint |
| | block_hash | string |
| | block_number | bigint |
| logs | address | string |
| | data | string |
| | topics | string |
| | start_block | string |
| | end_block | string |

FIG. 22

| | BLOCK HEIGHT | GENERATED TRANSACTION | UNIT PRICE | QUANTITY |
|---|---|---|---|---|
| A | 500 | UNIT PRICE SETTING TRANSACTION (TARGET TOKEN: A) | 50 | |
| B | 510 | REMITTANCE TRANSACTION (TARGET TOKEN: A) | | 10 |
| C | 520 | UNIT PRICE SETTING TRANSACTION (TARGET TOKEN: A) | 100 | |
| D | 530 | REMITTANCE TRANSACTION (TARGET TOKEN: A) | | 10 |
| E | 540 | UNIT PRICE SETTING TRANSACTION (TARGET TOKEN: A) | 105 | |
| F | 541 | UNIT PRICE SETTING TRANSACTION (TARGET TOKEN: A) | 110 | |
| G | 550 | REMITTANCE TRANSACTION (TARGET TOKEN: A) | | 20 |

FIG. 23

| | BLOCK HEIGHT | | UNIT PRICE | QUANTITY | AMOUNT OF MONEY |
|---|---|---|---|---|---|
| A | 500 | UNIT PRICE SETTING TRANSACTION (TARGET TOKEN: A) | 50 | | |
| B | 510 | REMITTANCE TRANSACTION (TARGET TOKEN: A) | 50 | 10 | 500 |
| C | 520 | UNIT PRICE SETTING TRANSACTION (TARGET TOKEN: A) | 100 | | |
| D | 530 | REMITTANCE TRANSACTION (TARGET TOKEN: A) | 100 | 10 | 1000 |
| E | 540 | UNIT PRICE SETTING TRANSACTION (TARGET TOKEN: A) | 105 | | |
| F | 541 | UNIT PRICE SETTING TRANSACTION (TARGET TOKEN: A) | 110 | | |
| G | 550 | REMITTANCE TRANSACTION (TARGET TOKEN: A) | 110 | 20 | 2200 |

DUPLICATED TRANSACTION DATA

BLOCK DATA

```
{
height: 2
tra_cnt:2
}
```

```
{
height: 2
tra_hash: yyyyy1
}
```
TRANSACTION A

```
{
height: 2
tra_hash: yyyyy2
}
```
TRANSACTION B

```
{
height: 2
tra_hash: yyyyy2
}
```
TRANSACTION C

NUMBER OF TRANSACTIONS IN BLOCK (tra_cnt) 2<NUMBER OF HASHES OF TRANSACTIONS 3

FIG. 28

Docker Version Detail

Table of contents

- Overall Summary Report
  - Currencies whose docker image is based on Github
  - Currencies whose docker image is based on Dockerhub

Overall Summary Report

Currencies whose docker image is based on Github

| Currency Name | Current Version (in CAPP2) | Current Version Date (in CAPP2) | Latest Version (in Github) | Latest Version Date (in Github) | Need To Upgrade? | Reference | Remarks |
|---|---|---|---|---|---|---|---|
| Bitcoin | v0.18.0 (Bitcoin Core 0.18.0) | 2019-04-30 | v0.19.1 (Bitcoin Core 0.19.1) | 2020-03-04 | True | Release detail | |
| BitcoinCash | v0.19.9 (0.19.9) | 2019-08-27 | v0.21.5 (0.21.5) | 2020-04-23 | True | Release detail | |
| Litecoin | v0.17.1 (Litecoin Core v0.17.1) | 2019-04-30 | v0.17.1 (Litecoin Core v0.17.1) | 2019-04-30 | False | Release detail | |
| Ethereum / Ethereum Classic | v2.4.9 (Parity Ethereum 2.4.9-stable) | 2019-07-01 | v3.0.0-alpha.1 (initial OpenEthereum release) | 2020-04-01 | True | Release detail | |
| Nem | v0.6.97 | Not Available | v0.6.97 | Not Available | False | Release detail | |

CRYPTOGRAPHIC ASSET BLOCKCHAIN PROCESSING APPARATUS, PROCESSING METHOD, PROCESSING SYSTEM, AND PROCESSING PROGRAM

TECHNICAL FIELD

The present invention relates to a system for collecting and analyzing cryptographic asset blockchain data for use in an audit corporation or the like. Specifically, the present technology relates to a system for analyzing various types of data regarding blocks, transactions, and the like included in cryptographic asset blockchain data and supporting audit of transaction information (balance and the like) of various virtual currencies (here, referred to as "cryptographic assets") such as Bitcoin and Ethereum.

BACKGROUND ART

There is a distributed ledger technology using a blockchain as a technology for sharing and managing records when an unspecified number of individuals or corporate entities perform business transactions through the Internet. In the distributed ledger technology using the blockchain, a plurality of implementation methods are devised according to the applications, purposes, and the like, and data recording formats and methods according to each implementation method are defined.

In general, transaction information of cryptographic assets such as Bitcoin can be acquired via the Internet using a block explorer (Non Patent Literature 1) such as BLOCK-CHAIR. A conventional block explorer can specify specific addresses or blocks one by one to obtain desired transaction information. In addition, by accessing a blockchain is which transaction information of various cryptographic assets is recorded and acquiring the transaction information, it is also possible to audit the transaction content on the basis of the transaction information (Patent Literature 1).

CITATION LIST

Patent Literature

Patent Literature 1: JP 2018-525729 A

Non Patent Literature

Non Patent Literature 1: BLOCKCHAIR, URL https://blockchair.com/ (Searched on Aug. 27, 2020)

SUMMARY OF INVENTION

Technical Problem

Sending a query for searching a blockchain using a conventional application programming interface (API) of a block explorer and receiving transaction information on the Internet may be watched (intercepted) by a third party. For example, in a case where a plurality of queries for searching a blockchain using a block explorer is transmitted from a certain computer in a certain period on the Internet for the purpose of audit, a relationship between an IP address of the computer and an owner of the address (cryptographic asset account) or a plurality of addresses and the like belonging to the same owner are specified, and a plurality of addresses associated with each other (clustered), a content of the query, transaction information obtained as a search result, and the like can be easily associated with each other and may be misused.

Therefore, by designating a predetermined period and searching a blockchain published on the Internet and accumulating data (blocks, transactions, and the like) in a storage apparatus (database or the like) of a computer such as a server in a private network for each type of the cryptographic asset, it is possible to analyze the accumulated blockchain data and perform audit or the like of the transaction information under a private environment in which a query for a specific transaction or transaction information is not intercepted by a third party.

However, in interpreting a data record (blocks, transactions, and the like) in a blockchain of a certain cryptographic asset, it is usually necessary to use software (for example, an API of node software) provided by a developer of software that has devised an implementation method thereof, and since an input/output method of the software also differs depending on the implementation method, it is difficult to collect and analyze blockchain data according to a plurality of different implementation methods.

In addition, depending on an implementation method, information regarding a transaction quantity when a transaction is performed and a unit price used for the transaction are recorded in different data records, and in order to know how much amount of money of the cryptographic asset has moved for a certain transaction, it is necessary to acquire each of the unit price data and the transaction quantity data and then perform calculation in combination (transaction amount=unit price of time when transaction is performed× transaction quantity).

Further, depending on the implementation method, only the latest time point information is stored as the balance of the cryptographic asset of the participant of the transaction, and the balance information at the specific time point sought in the past cannot be acquired.

Therefore, the present invention provides a cryptographic asset blockchain processing apparatus, a processing method, a processing system, and a processing program (hereinafter, referred to as a cryptographic asset blockchain processing apparatus or the like) that improve convenience of analysis of a large amount of data for an accounting audit or the like by collecting blockchain data generated by a plurality of different implementation methods, converting the data into data that can be analyzed, and processing transaction content such as a quantity, a unit price, and a partner of a transaction cryptographic asset into a standardized format.

Solution to Problem

As one embodiment of the cryptographic asset blockchain processing apparatus according to the present invention, the cryptographic asset blockchain processing apparatus includes at least:

a data collection unit; and a data conversion unit, wherein the data collection unit accesses a cryptographic asset blockchain designated by a user and collects blockchain data from the cryptographic asset blockchain based on a request range predetermined, the data conversion unit converts the blockchain data into analyzable transaction data, and the blockchain data and the analyzable transaction data are stored in a data storage apparatus connected to the cryptographic asset blockchain processing apparatus.

As a preferred embodiment of the cryptographic asset blockchain processing apparatus according to the present invention, the data storage apparatus is a cloud storage accessible by the cryptographic asset blockchain processing apparatus via a network.

As a preferred embodiment of the cryptographic asset blockchain processing apparatus according to the present invention, the data collection unit operates in a static mode, the data collection unit operating in the static mode designates the number of transaction data for each data batch and sets an end point of the request range, and sets identification information of las transaction data of data collected last time as a start point of the request range.

As a preferred embodiment of the cryptographic asset blockchain processing apparatus according to the present invention, the data collection unit operates in a dynamic mode, the data collection unit operating in the dynamic mode designates a data size for each data batch and sets an end point of the request range, and sets identification information of last transaction data of data collected last time as a start point of the request range.

As a preferred embodiment of the cryptographic asset blockchain processing apparatus according to the present invention, the data collection unit operates in an automatic collection mode, the data collection unit operating in the automatic collection mode acquires identification information of latest data on the cryptographic asset blockchain and sets the identification information as an end point of the request range, and sets identification information of last transaction data of data collected last time by the data collection unit as a start point of the request range.

As a preferred embodiment of the cryptographic asset blockchain processing apparatus according to the present invention, when a previous collection mode is a static mode in which the number of transaction data for each data batch is designated or a dynamic mode in which a data size for each data batch is designated, the data collection unit recalculates identification information of last transaction data of data collected last time based on the number of transaction data or the data size of the previous collection mode and sets the identification information as a start point of the request range.

As a preferred embodiment of the cryptographic asset blockchain processing apparatus according to the present invention, the blockchain data includes transaction data to which an identifiable block number is assigned, the transaction data includes at least one or more pieces of unit price transaction data for unit price setting and one or more pieces of quantity transaction data for quantity designation, and the data conversion unit searches, for each of the one or more pieces of quantity transaction data, unit price transaction data to which a block number closest to a block number assigned to the one or more pieces of quantity transaction data is assigned, and calculates an amount of money related to a transaction by multiplying a value of a unit price of the unit price transaction data searched by a quantity of the one or more pieces of quantity transaction data.

As a preferred embodiment of the cryptographic asset blockchain processing apparatus according to the present invention, the data storage apparatus includes a blockchain data storage apparatus and a transaction data storage apparatus, the blockchain data collected by the data collection unit is stored in the blockchain data storage apparatus, and transaction data including the amount of money calculated by the data conversion unit is stored in the transaction data storage apparatus.

As a preferred embodiment of the cryptographic asset blockchain processing apparatus according to the present invention, the cryptographic asset blockchain processing apparatus further includes a data analysis unit, and the data analysis unit acquires the transaction data matching a block number from a first block number to a block number at a specific time point from the transaction data storage apparatus, and calculates a balance by adding an amount of money of the transaction data acquired for each address that is a recording unit corresponding to a bank account number in the cryptographic asset blockchain.

As a preferred embodiment of the cryptographic asset blockchain processing apparatus according to the present invention, the blockchain data includes at least block data and transaction data, the data conversion unit adds an attribute of year/month/date related to a transaction date and time to each of the block data and the transaction data to convert the block data and the transaction data into transaction data distinguishable by year/month/date, and the transaction data is classified by year/month/date and stored in the data storage apparatus.

As a preferred embodiment of the cryptographic asset blockchain processing apparatus according to the present invention, the data storage apparatus includes a blockchain data storage apparatus and a transaction data storage apparatus, the blockchain data collected by the data collection unit is stored in the blockchain data storage apparatus, and the transaction data to which the attribute of the year/month/date is added by the data conversion unit and which can be distinguished by the year/month/date is stored in the transaction data storage apparatus.

As a preferred embodiment of the cryptographic asset blockchain processing apparatus according to the present invention, the cryptographic asset blockchain processing apparatus further includes a data analysis unit, the data conversion unit divides the transaction data into transaction input data and transaction output data, and the data analysis unit calculates total revenue and total expenditure in a range of a specific block number based on the transaction input data and the transaction output data for each address that is a recording unit corresponding to a bank account number in the cryptographic asset blockchain.

As a preferred embodiment of the cryptographic asset blockchain processing apparatus according to the present invention, the cryptographic asset blockchain processing apparatus further includes a data analysis unit, and the data analysis unit calculates a balance for each address based on the transaction data and a result of a smart contract for each address that is a recording unit corresponding to a bank account number in the cryptographic asset blockchain.

As a preferred embodiment of the cryptographic asset blockchain processing apparatus according to the present invention, the cryptographic asset blockchain processing apparatus further includes a consistency verification unit, the transaction data includes block data to which a sequence number is assigned in a generation order, the consistency verification unit checks whether the sequence number is duplicated or missing by sequentially collating the sequence number of the block data, and in a case where there is a duplication or missing in the sequence number, notification of inconsistency of the block data corresponding to the sequence number is provided.

As a preferred embodiment of the cryptographic asset blockchain processing apparatus according to the present invention, the consistency verification unit counts the number of transaction data for each sequence number with respect to transaction data having a sequence number of a belonging block, and compares the number counted of transaction data with the number of transactions recorded in block data to which the sequence number is assigned, and provides notification of an inconsistency of the block data in a case where there is a difference.

As a preferred embodiment of the cryptographic asset blockchain processing apparatus according to the present invention, the cryptographic asset blockchain processing apparatus further includes a consistency verification unit, the consistency verification unit calculates a verification balance of an address designated by a user using a block explorer managed by a third party, acquires a balance at the address designated from a balance calculated for each address by the data analysis unit, and compares the balance calculated by the data analysis unit with the verification balance, and provides notification that there is an inconsistency in data of the address designated in a case where there is a difference.

As a preferred embodiment of the cryptographic asset blockchain processing apparatus according to the present invention, the consistency verification unit accesses a site that manages a version of node software of a cryptographic asset, checks a latest version of node software of a cryptographic asset desired, compares the latest version with a version of node software of the cryptographic asset stored in the data storage apparatus, and provides notification that there is an inconsistency in the version of the node software of the cryptographic asset in a case where there is a difference in the version.

As one embodiment of the cryptographic asset blockchain processing method according to the present invention, the cryptographic asset blockchain processing method includes:

a step of accessing a cryptographic asset blockchain designated by a user;

a step of collecting blockchain data from the cryptographic asset blockchain based on a request range predetermined; and a step of converting the blockchain data into analyzable transaction data, wherein the blockchain data and the analyzable transaction data are stored a data storage apparatus connected to the cryptographic asset blockchain processing apparatus.

As one embodiment of the cryptographic asset blockchain processing system according to the present invention, the system further includes:

an information processing terminal; and a cloud storage, wherein the cryptographic asset blockchain processing apparatus, the information processing apparatus, and the cloud storage are connected via a network.

As one embodiment of the cryptographic asset blockchain processing program according to the present invention, the program is executed by a computer to cause the computer to function as each unit of the cryptographic asset blockchain processing apparatus.

As another embodiment of the cryptographic asset blockchain processing program according to the present invention, the program is executed by a computer to cause the computer to execute each step of the cryptographic asset blockchain processing method.

Advantageous Effects of Invention

The cryptographic asset blockchain processing apparatus or the like according to the present invention collects blockchain data (blocks, transactions, and the like) of a cryptographic asset on the Internet, accumulates the blockchain data for each type of the cryptographic asset in a storage apparatus (database or the like) of a computer such as a server under a private environment in which a query or transaction information for a specific transaction is not intercepted by a third party, and converts the blockchain data into a data format suitable for analysis, so that it is possible not only to safely analyze the blockchain data and calculate a balance or the like for each address for audit but also to collect and analyze the blockchain data according to a plurality of different implementation methods of the cryptographic assets.

In addition, the cryptographic asset blockchain processing apparatus or the like generates virtual transaction data in which a transaction amount (=the unit price of the time when the transaction is performed×the transaction quantity) calculated from the unit price data and the transaction quantity data is recorded, in a case where information regarding the transaction quantity at the time when the transaction is performed and the unit price used for the transaction are recorded in different data records, depending on the implementation methods of the cryptographic assets, and thus, can comprehensively aggregate the transaction data up to a certain time point without being affected by the implementation methods of the cryptographic assets, and can easily calculate the balance of the cryptographic assets of the participants in the transaction at a specific time point sought in the past.

Furthermore, by verifying duplication or missing of the collected blockchain data, a difference in the version of the node software of the cryptographic asset, and the like, it is possible to ensure consistency of the transaction data to be analyzed.

BRIEF DESCRIPTION OF DRAWINGS

FIG. 7 is a diagram illustrating an example of a display screen of a block explorer that displays one piece of block information in a blockchain.

FIG. 8 is a diagram illustrating an example of collected block information.

FIG. 9 is a diagram illustrating an example of a display screen of a block explorer that displays one piece of transaction information in a blockchain.

FIG. 10 is a diagram illustrating an example of collected transaction information.

FIG. 12 is a diagram illustrating an example of block information stored in one folder illustrated in FIG. 11.

FIG. 13 is a diagram illustrating an example of a configuration of level 1 data of Bitcoin and a configuration of level 2 data corresponding to the level 1 data.

FIG. 14 is a diagram illustrating an example of a configuration of level 1 data of Bitcoin and a configuration of level 2 data corresponding to the level 1 data.

FIG. 16 is a diagram illustrating an example of a configuration of level 1 data of Ethereum and a configuration of level 2 data corresponding to the level 1 data.

FIG. 17 is a diagram illustrating an example of a configuration of level 1 data of Ethereum and a configuration of level 2 data corresponding to the level 1 data.

FIG. 18 is a diagram illustrating an example of a configuration of level 1 data of Ethereum and a configuration of level 2 data corresponding to the level 1 data.

FIG. 19 is a diagram illustrating an example of a configuration of level 1 data of Ethereum and a configuration of level 2 data corresponding to the level 1 data.

FIG. 20 is a diagram illustrating an example of a configuration of level 1 data of Ethereum.

FIG. 22 is a diagram illustrating an example of transaction data that can be acquired by an API of node software.

FIG. 23 is a diagram illustrating an example of virtual transaction data obtained by performing the processing illustrated in FIG. 22 on the transaction data illustrated in FIG. 22.

FIG. 28 is a diagram illustrating an example of a report that is automatically generated by comparing version updates of cryptographic assets on a blockchain as needed.

DESCRIPTION OF EMBODIMENTS

Figure 1:
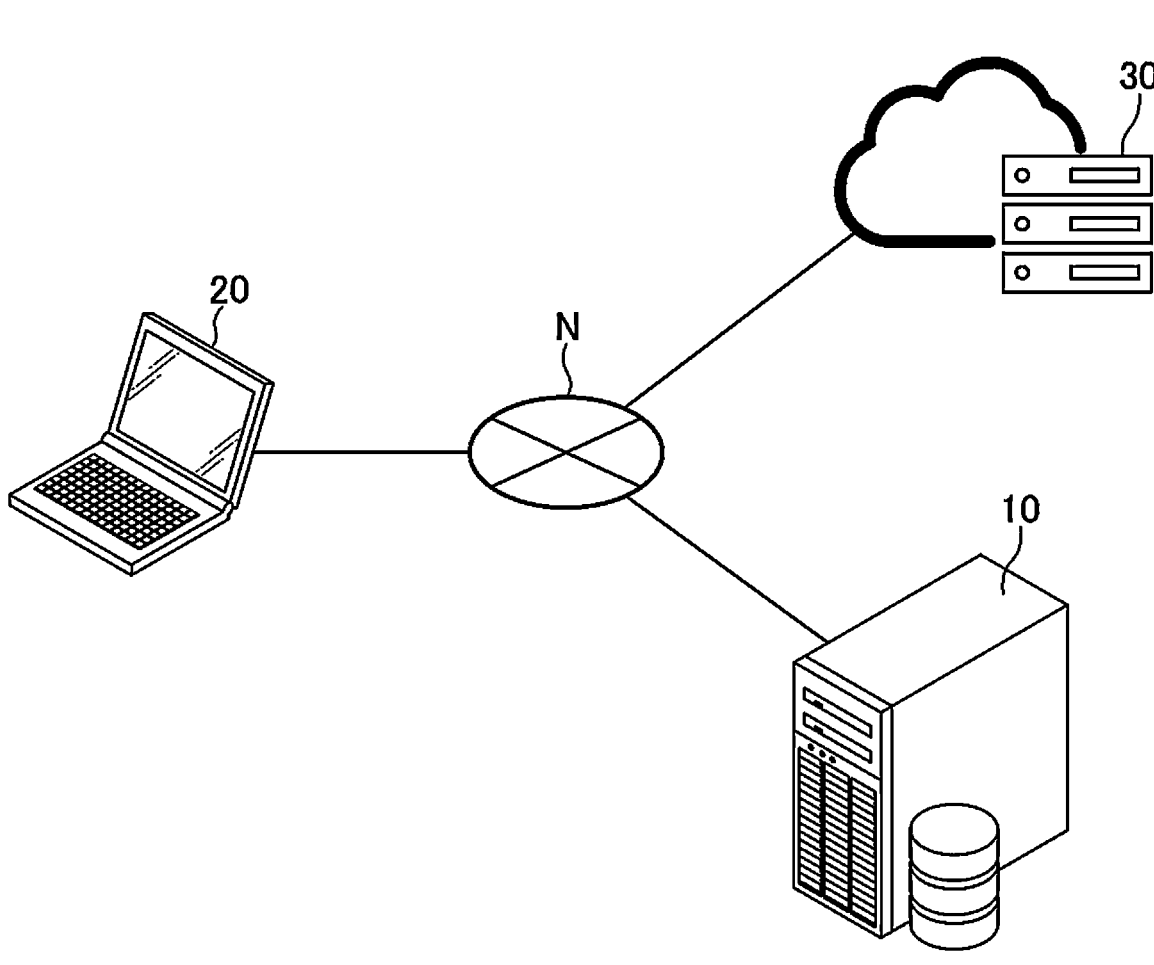
FIG. 1 is a diagram illustrating a configuration of a cryptographic asset blockchain processing system according to an embodiment of the present invention.

Hereinafter, embodiments of the present invention will be described with reference to the drawings in all the drawings for describing the embodiments, the same reference numerals are assigned to the same elements in principle, and repeated description thereof will be omitted. The individual embodiments of the present invention are not independent, and can be appropriately implemented in combination.

FIG. 1 illustrates a configuration of a cryptographic asset blockchain processing system according to an embodiment of the present invention. The cryptographic asset blockchain processing system illustratively includes a cryptographic asset blockchain processing apparatus 10, an information processing terminal 20, and a cloud storage (online storage) 30. The cryptographic asset blockchain processing apparatus 10 is, for example, a computer connectable to a network N such as a server. Furthermore, the information processing terminal 20 is a terminal connectable to the network N, for example, a personal computer, a notebook computer, a smartphone, a mobile phone, or the like.

The network N may be, for example, an open network such as the Internet, an intranet connected by a dedicated line, or a closed network. The network N is not limited thereto, and a closed network and an open network can be appropriately used in combination according to a required level of security or the like.

As one embodiment, the cryptographic asset blockchain processing system includes at least the cryptographic asset blockchain processing apparatus 10 and the information processing terminal 20 connected to the cryptographic asset blockchain processing apparatus 10 via the network N. By directly operating the cryptographic asset blockchain processing apparatus 10 or operating via the information processing terminal 20, the user can access a blockchain related to a cryptographic asset (hereinafter, referred to as a cryptographic asset blockchain) disclosed on the Internet and accumulate data recorded in the blockchain (hereinafter, referred to as blockchain data) in the storage apparatus of the cryptographic asset blockchain processing apparatus 10. As another embodiment, the cryptographic asset blockchain processing system may accumulate blockchain data collected from the cryptographic asset blockchain in the cloud storage 30 instead of the storage apparatus of the cryptographic asset blockchain processing apparatus 10.

By operating the storage apparatus of the cryptographic asset blockchain processing apparatus 10 and the cloud storage 30 under a closed environment (private environment) in which external access is blocked, it is possible to prevent a third party from intercepting a query or transaction information for a specific transaction.

Figure 2:
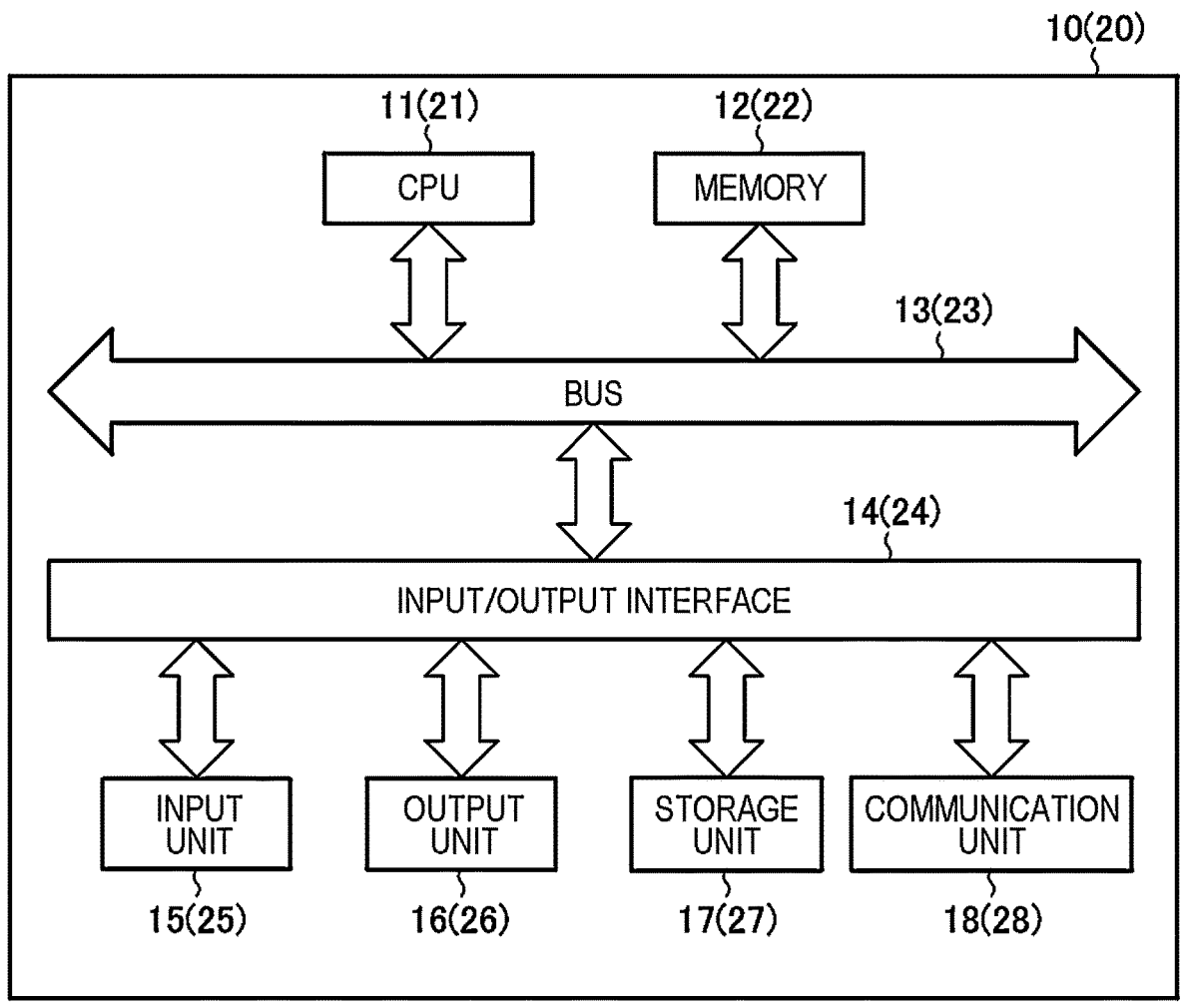
FIG. 2 is a block diagram illustrating an example of a hardware configuration of a cryptographic asset blockchain processing apparatus according to an embodiment of the present invention.

FIG. 2 is a block diagram illustrating an example of a hardware configuration of the cryptographic asset blockchain processing apparatus according to an embodiment of the present invention. Note that, in the figure, reference numerals corresponding to the hardware of the cryptographic asset blockchain processing apparatus 10 are described without parentheses, and reference numerals corresponding to the hardware of the information processing terminal 20 are described with parentheses.

The cryptographic asset blockchain processing apparatus 10 is, for example, a server (computer), and illustratively includes a central processing unit (CPU) 11, a memory 12 including a read only memory (ROM), a random access memory (RAM), and the like, a bus 13, an input/output interface 14, an input unit 15, an output unit 16, a storage unit 17, and a communication unit 18.

The CPU 11 executes various processes in accordance with programs recorded in the memory 12 or programs loaded from the storage unit 11 into the memory 12. The CPU 11 can execute, for example, a program for causing a server (computer) to function as the cryptographic asset blockchain processing apparatus of the present invention. In addition, at least some functions of the cryptographic asset blockchain processing apparatus can be implemented in hardware by an application specific integrated circuit (ASIC) or the like.

The memory 12 appropriately stores data and the like necessary for the CPU 11 to execute various processes. The CPU 11 and the memory 12 are connected to each other via the bus 13. The input/output interface 14 is also connected to the bus 13. The input unit 15, the output unit 16, the storage unit 17, and the communication unit 18 are connected to the input/output interface 14.

The input unit 15 includes various buttons, a touch panel, a microphone, or the like, and inputs various types of information according to an instruction operation of the user or the like of the cryptographic asset blockchain processing apparatus 10. Note that the input unit 15 may be implemented by an input device such as a keyboard or a mouse independent of a main body that accommodates other units of the cryptographic asset blockchain processing apparatus 10.

The output unit 16 includes a display, a speaker, or the like, and outputs image data or audio data such as a still image or a moving image. Image data and music data output by the output unit 16 are output from a display, a speaker, or the like as an image or music so as to be recognizable by the user.

The storage unit 17 includes a semiconductor memory such as a dynamic random access memory (DRAM) or a storage apparatus such as a solid state drive (SSD) or a hard disk, and can store various data.

The communication unit 18 implements communication with other devices. For example, the communication unit 18 can communicate with the information processing terminal 20 and the cloud storage 30 via the network N.

Note that a drive (not illustrated) is appropriately provided in the cryptographic asset blockchain processing apparatus 10 as necessary. For example, a removable medium including a magnetic disk, an optical disk, a magneto-optical disk, a semiconductor memory, or the like is appropriately mounted on the drive. The removable medium stores a program for accessing the cryptographic asset blockchain to collect blockchain data, and various data such as text data and image data. Programs and various data read from the removable medium by the drive are installed in the storage unit 17 as necessary.

Next, a hardware configuration of the information processing terminal 20 will be described. As illustrated in FIG. 2, the information processing terminal 20 includes, for example, a CPU 21, a memory 22, a bus 23, an input/output interface 24, an input unit 25, an output unit 26, a storage unit 27, and a communication unit 28. Each of these units has a function equivalent to that of each unit having the same name different only in the reference numeral included in the above-described cryptographic asset blockchain processing apparatus 10. Therefore, redundant description will be omitted. Note that, in a case where the information processing terminal 20 is configured as a portable device, each piece of hardware included in the information processing terminal 20 and a display or a speaker may be implemented as an integrated device.

Figure 3:
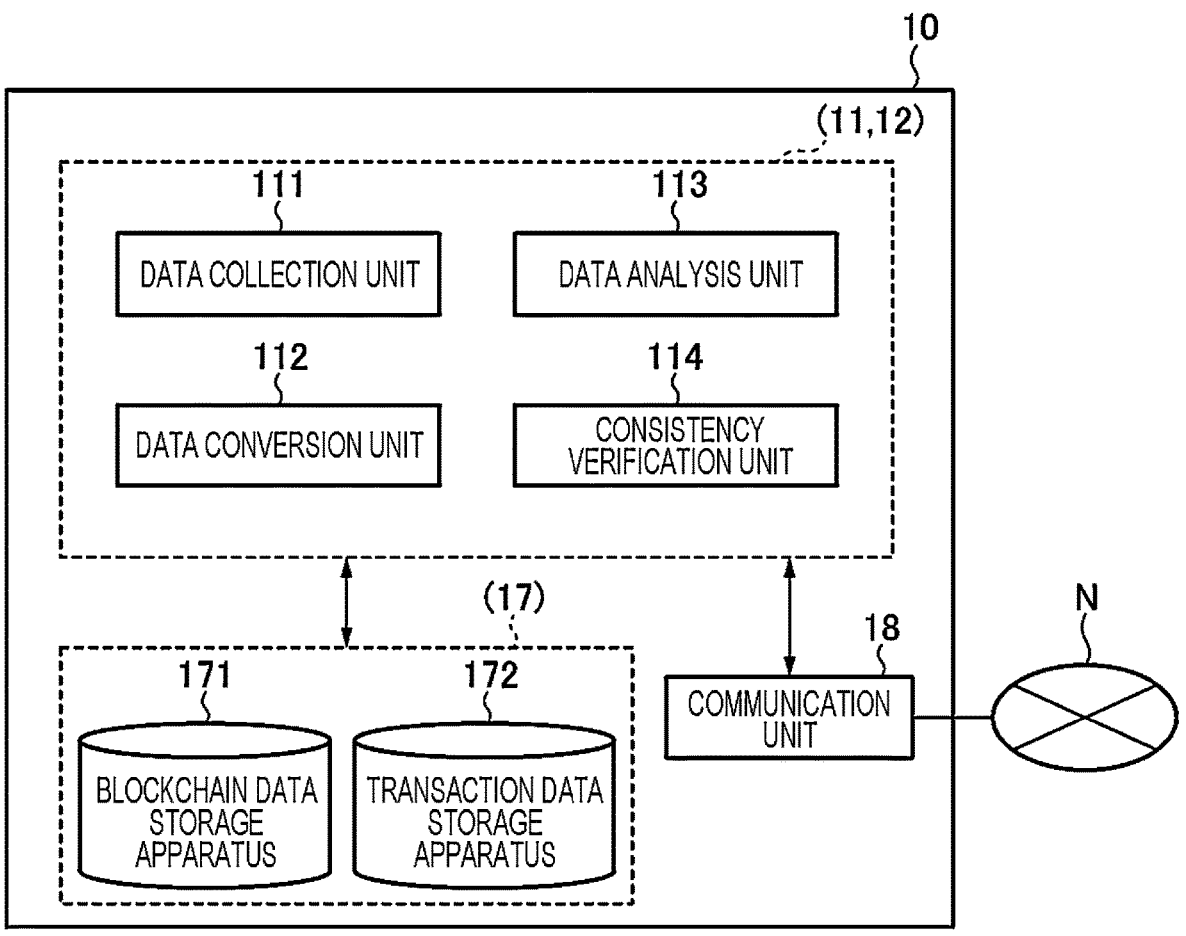
FIG. 3 is a block diagram illustrating a configuration of a cryptographic asset blockchain processing apparatus according to an embodiment of the present invention.

A functional configuration of the cryptographic asset blockchain processing apparatus 10 included in the cryptographic asset blockchain processing system will be described with reference to FIG. 3. FIG. 3 is a block diagram illustrating a configuration of the cryptographic asset blockchain processing apparatus according to an embodiment of the present invention. For example, in a case where a program for performing processing such as collection, conversion, analysis, and consistency verification of blockchain data is executed by a server (computer), the server functions as, for example, the cryptographic asset blockchain processing apparatus 10, and a data collection unit 111, a data conversion unit 112, a data analysis unit 113, and a consistency verification unit 114 function in hardware resources such as the memory 12 in addition to the CPU 11.

In addition, the storage unit 17 can function as the blockchain data storage apparatus 171 and the transaction data storage apparatus 172 by using a part of the storage area of the storage unit 17. As another embodiment, the blockchain data storage apparatus 171 and the transaction data storage apparatus 172 may be configured as an external storage apparatus separate from the cryptographic asset blockchain processing apparatus 10, or for example, the cloud storage 30 may be used as the external storage apparatus. In these embodiments, the blockchain data storage apparatus 171 and the transaction data storage apparatus 172 are divided, but may be one data storage apparatus without being divided. Details of the information stored in the blockchain data storage apparatus 171 and the transaction data storage apparatus 172 will be described later.

The cryptographic asset blockchain processing apparatus 10 requests data recorded in the blockchain regarding the cryptographic asset disclosed on the Internet using the API provided by the conventional node software, and stores the downloaded blockchain data (here, also referred to as level 1 data) in the blockchain data storage apparatus 171 which is a data storage apparatus. This processing can be performed by batch processing. In order to download blockchain data (level a data) from the cryptographic asset blockchain, it is necessary to develop nodes corresponding to different implementation methods of the cryptographic asset, and a plurality of the cryptographic asset blockchain processing apparatuses 10 can be provided to function as nodes corresponding to different implementation methods of the cryptographic asset. The blockchain data (level 1 data) is converted into transaction data (level 2 data) in the cryptographic asset blockchain processing apparatus 10 (node), and can be transferred to the cloud storage 30 via the node and stored.

In the cryptographic asset blockchain processing system, for example, it is possible to handle types of cryptographic assets such as UTXO type cryptographic assets such as Bitcoin and Bitcoin Cash derived therefrom, and account type cryptographic assets such as Ethereum and Nem.

The cryptographic asset blockchain processing apparatus 10 designates a range of requested data to collect blockchain data from the cryptographic asset blockchain published on the network. The cryptographic asset blockchain processing apparatus 10 includes three types of modes for designating a range of data, and can execute collection of blockchain data by setting one of the modes.

The three modes include a static mode, a dynamic mode, and an automatic collection mode. In the static mode and the dynamic mode, blockchain data is collected by batch processing.

In the static mode, the number of data per batch (the number of data in which a transaction is recorded) is designated, and the cryptographic asset blockchain processing apparatus 10 can collect blockchain data according to the designated number of data. For example, in a case where the number of data for each batch is designated as 1000, 1000 pieces of blockchain data (that is, data in which a transaction is recorded) are collected, and the data can be stored in the blockchain data storage apparatus 171 by being divided for each folder.

In the dynamic mode, a data size for each batch is designated, and the cryptographic asset blockchain processing apparatus 10 can collect blockchain data according to the designated data size. For example, in a case where the data size for each batch is designated as 250 MB, 250 MB blockchain data (data in which a transaction is recorded) can be collected. Note that, since the number of data in which the transaction is recorded is not constant for each block in the cryptographic asset blockchain, in a case where the data size is designated, the number of blocks may be different even for blockchain data having the same data size.

Figure 4:
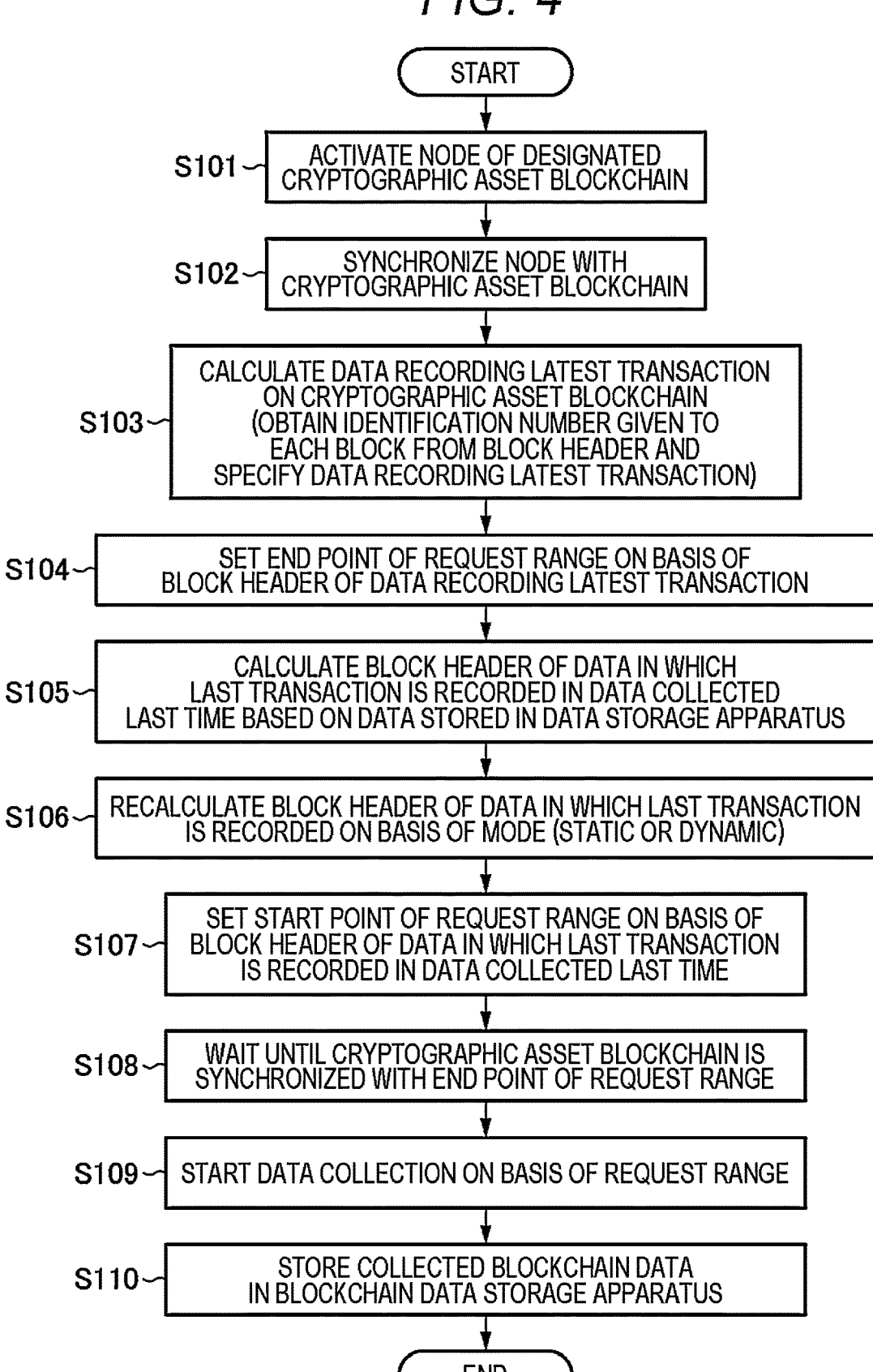
FIG. 4 is a flowchart illustrating a flow of processing of collecting blockchain data.

In the automatic collection mode, a blockchain request range or the like is automatically set in the cryptographic asset blockchain processing apparatus 10. A flow of processing in the automatic collection mode is illustrated in FIG. 4. FIG. 4 is a flowchart illustrating a flow of processing of collecting blockchain data. The user activates the cryptographic asset blockchain processing apparatus 10 (node) corresponding to the designated cryptographic asset blockchain using the information processing terminal 20 or the like (step S101). The cryptographic asset blockchain processing apparatus 10 accesses the cryptographic asset blockchain designated by the user.

The cryptographic asset blockchain processing apparatus 10 is synchronized with the cryptographic asset blockchain designated by the user (step S102). For example, the recording ledger held by the cryptographic asset blockchain processing apparatus 10 is synchronized with a recording ledger held by another node on the same blockchain network. Through synchronization, uncollected blockchain data can be identified in the cryptographic asset blockchain.

The cryptographic asset blockchain processing apparatus 10 calculates data recording the latest transaction in the cryptographic asset blockchain. For example, an identification number (identification information) assigned to each block is acquired from a block header included in the blockchain data, and data in which the latest transaction is recorded is specified (step S103). Then, the cryptographic asset blockchain processing apparatus 10 sets the end point of the data request range on the basis of the block header of the data (step S104).

The cryptographic asset blockchain processing apparatus 10 calculates a block header of data in which the last transaction is recorded in data collected in the previous execution of data collection on the basis of data stored in the data storage apparatus (for example, transaction data storage apparatus 172). For example, an identification number (identification information) assigned to each block is acquired from a block header included in the blockchain data, and data in which the last transaction is recorded is specified (step S105). In addition, the cryptographic asset blockchain processing apparatus 10 recalculates a block header of data in which the last transaction is recorded in data collected in the previous execution of data collection on the basis of the mode (static or dynamic) as necessary (step S106). It is possible to accurately specify the block header of the data in which the last transaction as the start point is recorded in the current data collection by designating whether the request range is set according to the number of data designated in the static mode or the request range is set according to the data size designated in the dynamic mode in the data collection executed last time.

The cryptographic asset blockchain processing apparatus 10 sets the start point of the data request range on the basis of the block header of the data in which the last transaction is recorded in the data collected in the previous execution of data collection (step S107). Note that, in a case where data collection is executed for the first time, the cryptographic asset blockchain processing apparatus 10 sets the first block (genesis block) of the blockchain as the start point of the data request range, and the processes in steps S105 and S106 can be omitted.

After setting the request range of the blockchain data, the cryptographic asset blockchain processing apparatus 10 waits until the cryptographic asset blockchain is synchronized with the end point of the request range (step S108), and after synchronization, starts data collection on the basis of the request range of the blockchain data (step S109). The cryptographic asset blockchain processing apparatus 10 stores the collected blockchain data (level 1 data) in the blockchain data storage apparatus.

Figure 5:
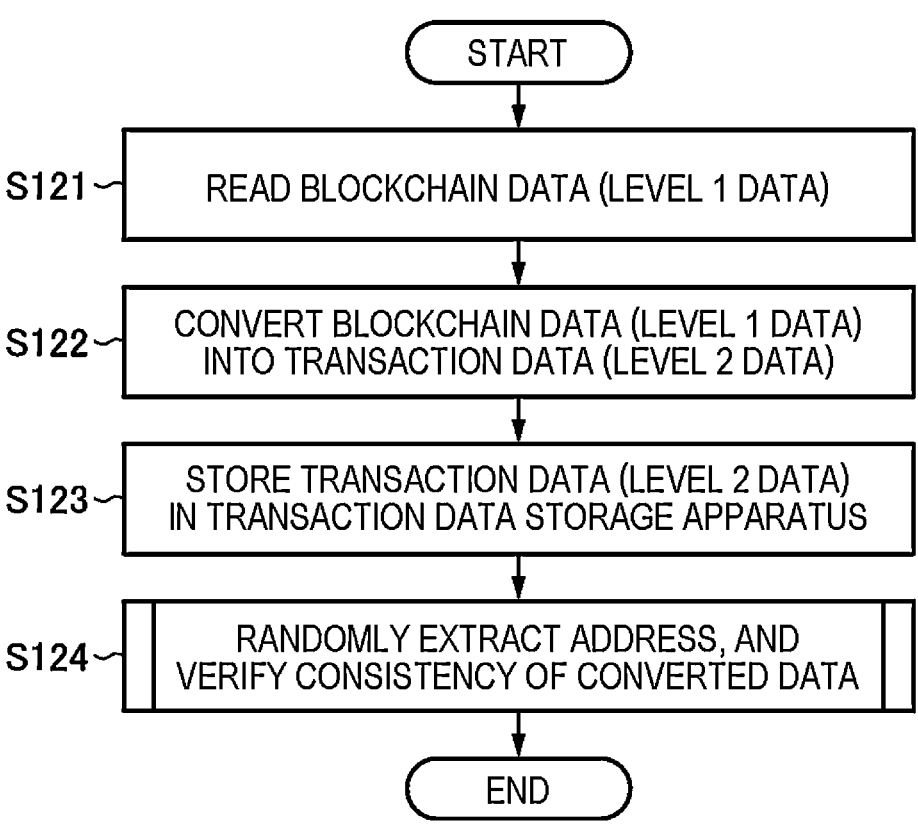
FIG. 5 is a flowchart illustrating a flow of processing of converting collected blockchain data (level 1 data) into transaction data (level 2 data) that can be analyzed.
Figure 6:
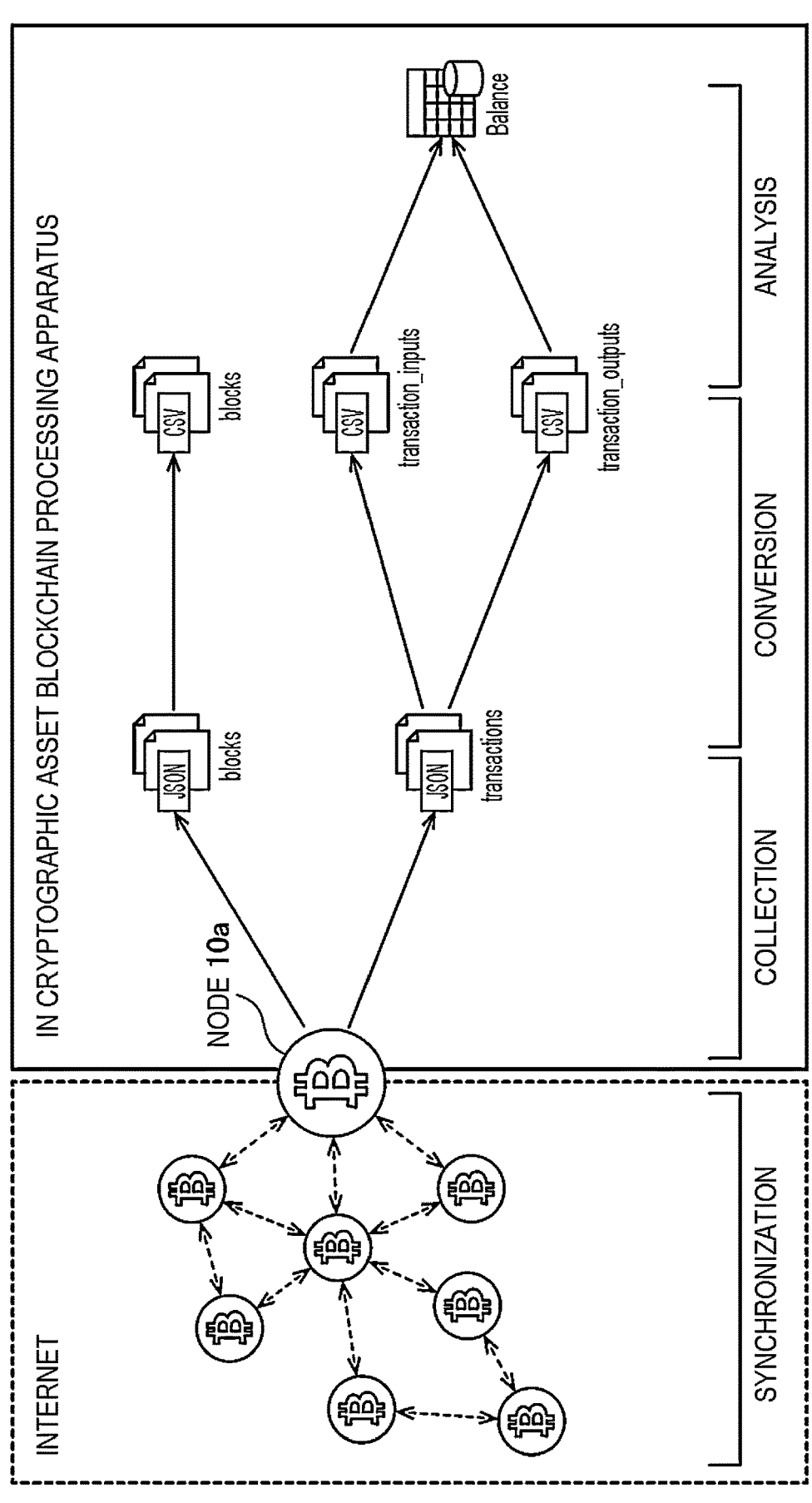
FIG. 6 is a diagram illustrating an overview of a processing flow of collecting and analyzing data of a blockchain of Bitcoin.
Figure 15:
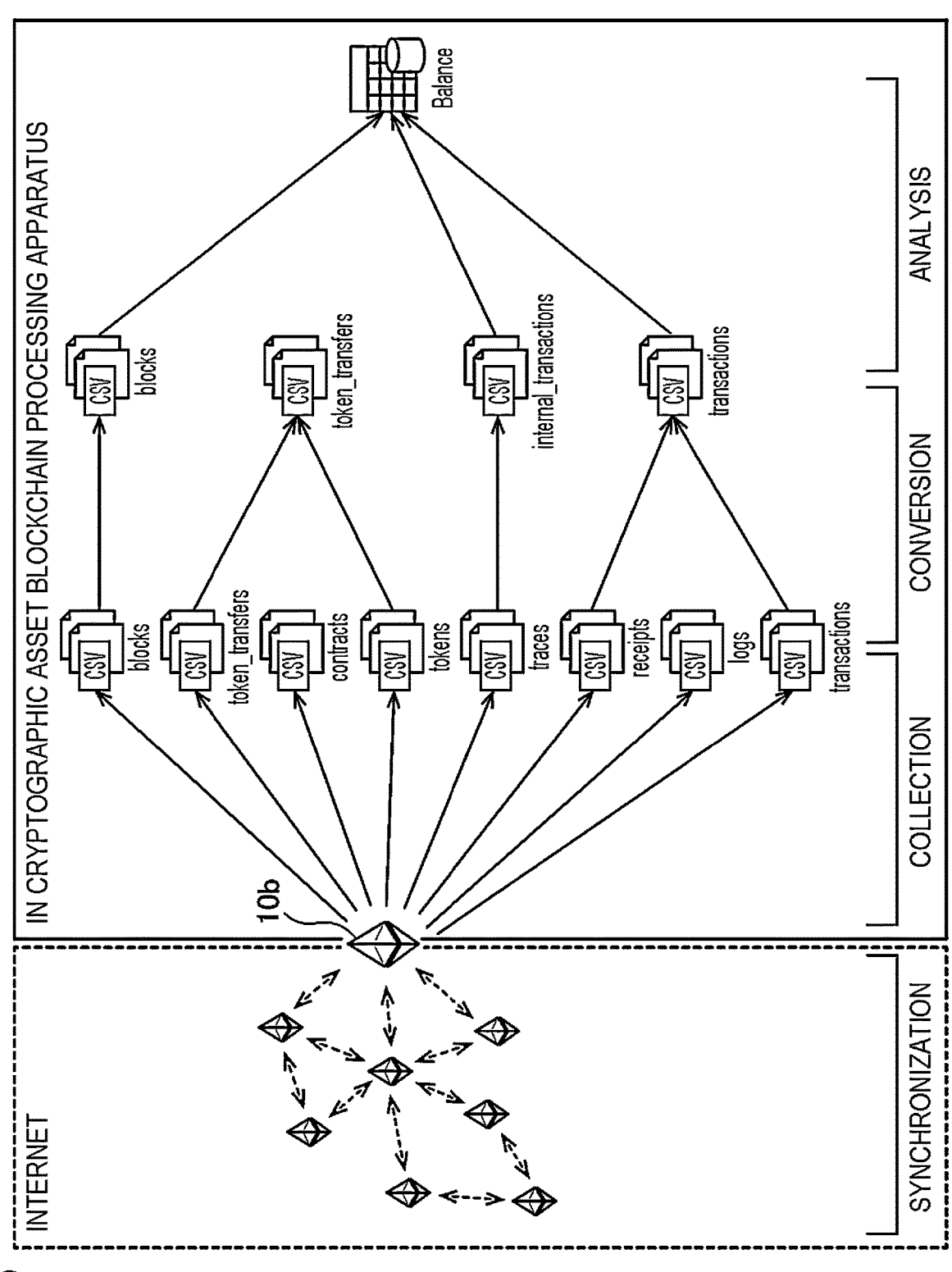
FIG. 15 is a diagram illustrating an overview of a processing flow of collecting and analyzing data of a blockchain of Ethereum.

FIG. 5 is a flowchart illustrating a flow of processing of converting collected blockchain data (level 1 data) into transaction data (level 2 data) that can be analyzed. The cryptographic asset blockchain processing apparatus 10 reads the blockchain data (level 1 data) accumulated in the blockchain data storage apparatus 171 (step S121), converts the blockchain data (level 1 data) into transaction data (level 2 data) in an analyzable data format, that is, a data format capable of calculating the balance or the like of the cryptographic asset for each address (account) (step S122), and stores the converted data in the transaction data storage apparatus 172 (step S123). Then, if necessary, the cryptographic asset blockchain processing apparatus 10 randomly extracts an address, which is a recording unit corresponding to a bank account number in the cryptographic asset blockchain, and verifies the consistency of the converted data (step S124). Details of the verification of the consistency will be described later (see FIGS. 21 to 26 and description thereof). FIG. 6 illustrates an example of Bitcoin and FIG. 15 illustrates an example of Ethereum as a processing flow for converting the level 1 data of the cryptographic asset into the level 2 data.

FIG. 6 illustrates an overview of a processing flow of collecting and analyzing data of the blockchain of Bitcoin. The user activates the cryptographic asset blockchain processing apparatus (node 10a in FIG. 6) corresponding to the implementation method of Bitcoin using the information processing terminal 20 and synchronizes with another node (corresponding to steps S101 to S102 in FIG. 4). After the synchronization, the node 10a collects blockchain data (level 1 data) (corresponding to steps S103 to S110 in FIG. 4).

The level 1 data is blockchain data collected directly from the blockchain via the node 10a. The level 1 data is divided into block data (blocks in FIG. 6) and transaction data (transactions in FIG. 6). A block in the blockchain is like a box that stores tens to hundreds of transactions (payments), and as a general blockchain structure, approval work of a transaction record (transaction) on the blockchain is performed at a block level.

The block data collected by the node 10a originates from the first recorded block (genesis block), and includes all blocks up to the block of the latest transaction or a designated past block, and block information (a hash value (Hash) calculated by hashing the content of the block by a one-way function, a block ID, the number of bits (Bit), a timestamp (Timestamp) in which the block is recorded, and the like) of each block.

FIG. 7 illustrates an example of each block information of the blockchain data of Bitcoin. FIG. 7 is an example of a display screen of a block explorer (for example, BLOCK-CHAIR) that displays one piece of block information in the blockchain. The block "80234" in FIG. 7 is between previously approved "80233" and the later approved "80235". Data of the block information (hash value and timestamp (Mined on)) of 80234 is collected from the node 10*a* in the format of FIG. 8. FIG. 8 illustrates an example of block information collected by the node 10*a*. For example, the block information of The block "80234" is described below in a JSON format.

{"hash": "00000000002862a0885ec35cd86b8d95b1e1c 0ba182845198b2a5b904d 1dfb3e", "size": 473, "stripped_size": 473, "weight": 1864, "number": 80234, "version": 1, "merkle_root": 729dff922569517e33b6f0e72ea567e53155df307 36ef8625e25cf5123c 0af68", "timestamp": 1284707604, "nonce": "122e0a2", "bits": "1b5bede6", "coinbase_param": "04e6ed5b1b021c01", "transaction_count": 2}

Further, an example of the transaction included in the block information of the block "80234" is as illustrated in FIG. 9. FIG. 9 illustrates an example of a display screen of a block explorer (BLOCKCHAIR) displaying one piece of transaction information in the blockchain. In the example illustrated in FIG. 9, the transaction includes senders and recipients of Bitcoin. When these pieces of data are collected, they are collected in a format (JSON) illustrated in FIG. 10.

Figure 11:
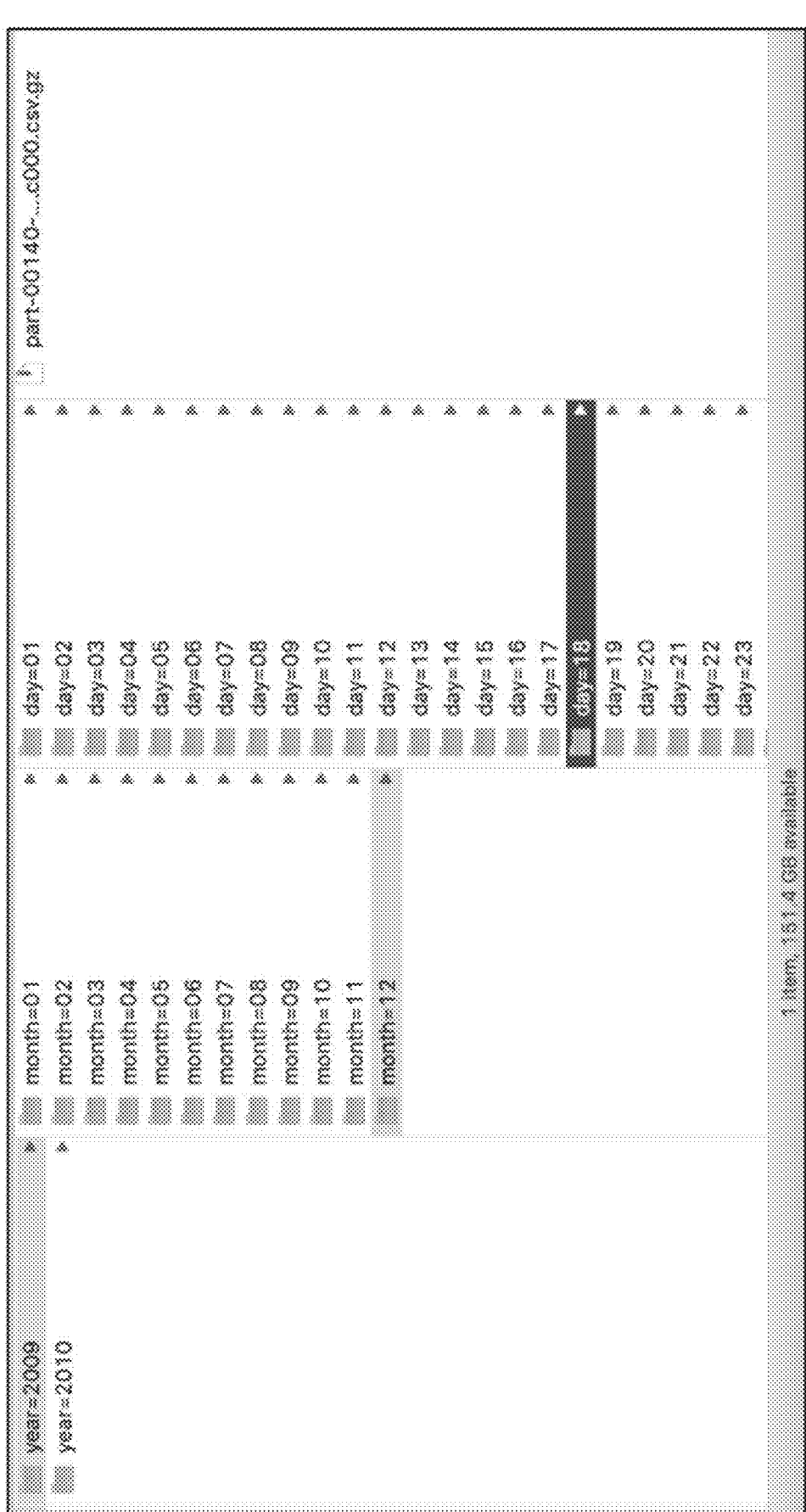
FIG. 11 is a diagram illustrating an example in which the block information and the transaction information (level 1 data) illustrated in FIGS. 8 and 10 are stored in a folder as information (level 2 data) distinguishable by year/month/date.

FIG. 10 illustrates an example of the collected transaction information by the node 10*a*, and FIG. 11 illustrates an example in which the block information and the transaction information (level 1 data) illustrated in FIGS. 8 and 10 are stored in a folder as information (level 2 data) distinguishable by year, month, and day. The level 2 data is converted into data searchable by year/month/date by adding an attribute of year/month/date to all the level 1 data on the basis of information such as a timestamp. The level 2 data is stored in the folder for each year/month/date.

FIG. 12 illustrates an example of block information stored in one folder illustrated in FIG. 11. In the example illustrated in FIG. 12, the folder of the block information on Dec. 18, 2009 includes information on blocks recorded on that day. Similarly, the transaction data is also divided into year, month, and day. The transaction data is also divided into a transaction input and a transaction output. Note that, according to a Bitcoin-specific unspent transaction output (UTXO) method, it is necessary to calculate the total expenditure and the total revenue for each account in a certain block range of the balance for each account.

Figure 14:
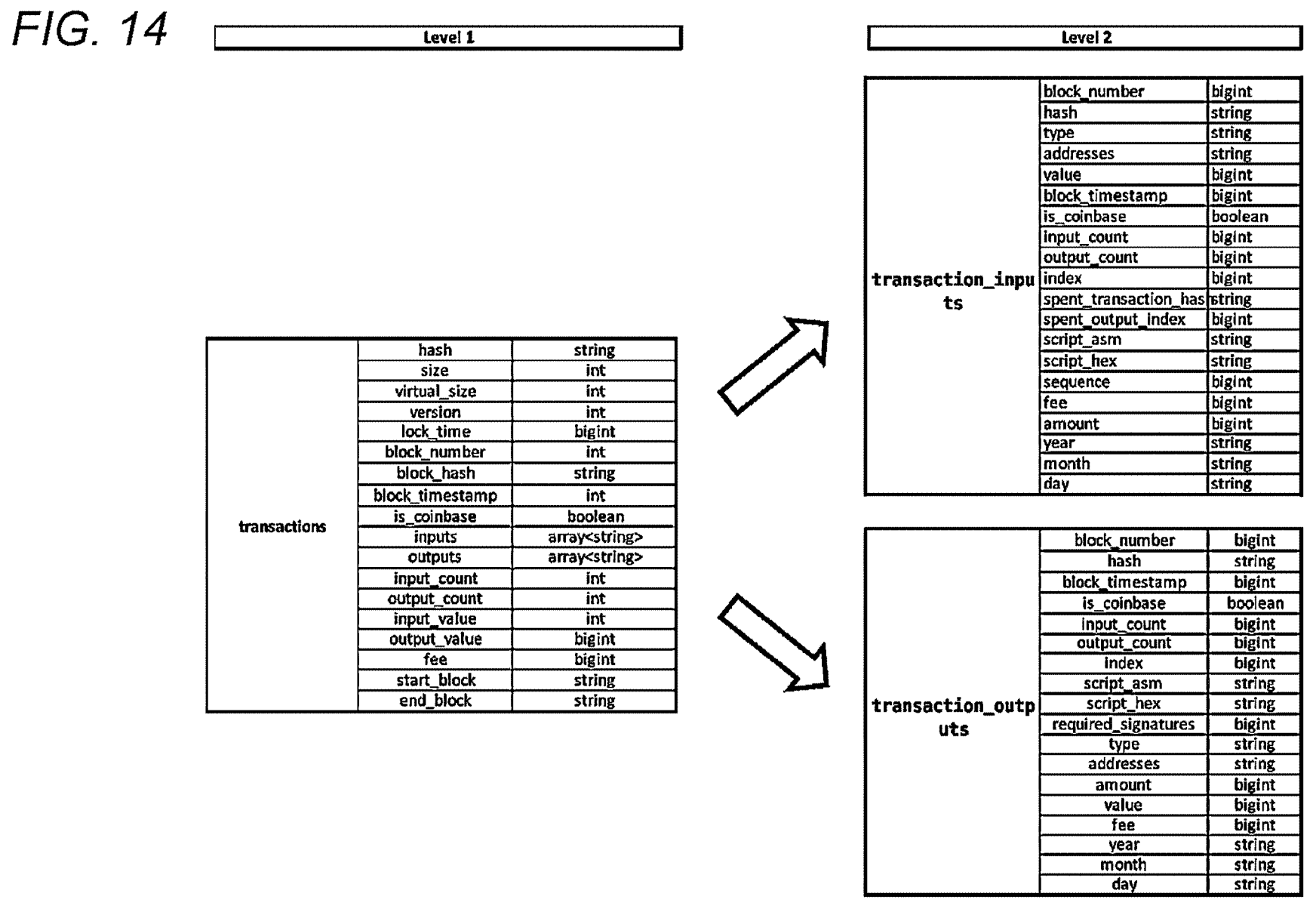

FIGS. 13 and 14 illustrate an example of a configuration of level 1 data of Bitcoin and a configuration of level 2 data corresponding to the level 1 data. Basically, in the item of the level 2 data of the block data (block) of Bitcoin, an item of year/month/date (year, month, day) is added to the item of the level 1 data. The item (hash, size, stripped_size, and the like) related to the Bitcoin block that can be acquired using the API of a conventional block explorer is described in the center column of the table of the block illustrated in FIG. 13, and the data type (string, bigint, and the like) of each item is described in the right column of the table. The same notation is applied to the table of the transaction (transactions, transaction_input, transaction_output) illustrated in FIG. 14.

The transaction data (transactions) of Bitcoin is divided into transaction input data and transaction output data as level 2 data, and an item of year/month/date (year, month, day) is added to each of the transaction input data and the transaction output data.

As another example of a cryptographic asset, collecting blockchain data from nodes of Ethereum is also described below. FIG. 15 illustrates an overview of a processing flow for collecting and analyzing data of the blockchain of Ethereum. Using the information processing terminal 20, the user activates the cryptographic asset blockchain processing apparatus (the node 10*b* in FIG. 15) corresponding to the implementation method of Ethereum and synchronizes with another node (corresponding to steps S101 to S102 in FIG. 4). After the synchronization, the node 10*b* collects block-chain data (level 1 data) (corresponding to steps S103 to S110 in FIG. 4). The synchronization, collection, and analysis processing by the cryptographic asset blockchain processing apparatus for Ethereum basically has substantially the same flow as the processing for Bitcoin.

Since the level 1 data of Ethereum is different from the level 1 data of Bitcoin, conversion for Ethereum is required for the conversion processing. For example, since Ethereum is not a Bitcoin UTXO method, it is necessary to convert processing results of transactions and smart contracts based on the Ethereum method so that the processing results can be used for calculation. As illustrated in FIG. 15, the Ethereum level 1 data includes not only block data (blocks) in CSV format but also data such as token_transfers, contracts, tokens traces, receipts, logs, and transactions in CSV format.

FIGS. 16 to 19 illustrate an example of a configuration of level 1 data of Ethereum and a configuration of level 2 data corresponding to the level 1 data, and FIG. 20 illustrates an example of a configuration of level 1 data of Ethereum. Similarly to the configuration of the data of Bitcoin illustrated in FIGS. 13 and 14, in each table, an item of data is described in a center column and a type of data is described in a right column. Basically, in the item of level 2 data of the block data (blocks) of Ethereum, an item of year/month/date (year, month, day) is added to the item of the level 1 data (see FIG. 16).

In token_transfers of the level 2 data of Ethereum, token_transfers and token included in the level 1 data are merged, unnecessary items are deleted at the time of merging, and items of year/month/date (year, month, day) are added (see FIG. 17). Further, in internal_transactions of the level 2 data of Ethereum, items of status, timestamp, and year/month/date (year, month, day) are added to traces included in the level 1 data (see FIG. 18).

Further, in transactions of the level 2 data of Ethereum, transactions and receipts included in the level 1 data are merged, unnecessary items are deleted at the time of merging, and items of timestamp and year/month/date (year, month, day) are added. (see FIG. 19). Contracts and logs included in the level 1 data illustrated in FIG. 20 are not particularly converted into the level 2 data.

In the cryptographic asset blockchain processing system of the present invention, as in the example of Bitcoin (FIGS. 6 to 14) and the example of Ethereum (FIGS. 15 to 20), it is possible to collect the blockchain data of the desired cryptographic asset by providing the cryptographic asset blockchain processing apparatus (node) corresponding to the implementation method and accessing the node corresponding to the cryptographic asset designated by the user, even for other cryptographic assets.

Each of the cryptographic asset blockchain processing apparatuses 10 (10*a*, 10*b*, and the like) corresponding to implementation methods of various cryptographic assets collects blockchain data (level 1 data) in synchronization with other nodes on the P2P network of the blockchain, converts the blockchain data into analyzable transaction data (level 2 data) that is calculation of a balance or the like, and periodically executes a processing command to analyze the transaction data (performs batch processing). For example, the cryptographic asset blockchain processing apparatus 10 can acquire data regarding the setting of the unit price of the transaction target by periodically executing these commands, create a data table that enables reference to the unit price at an arbitrary time point by combining the data regarding the unit price at the specific time point and the data regarding the time point at which the unit price is set, and store the data table in a data storage apparatus (for example, the blockchain data storage apparatus 171). In addition, the cryptographic asset blockchain processing apparatus 10 may acquire data regarding a time point and a quantity of transactions and store the data in the blockchain data storage apparatus 171.

Figure 21:
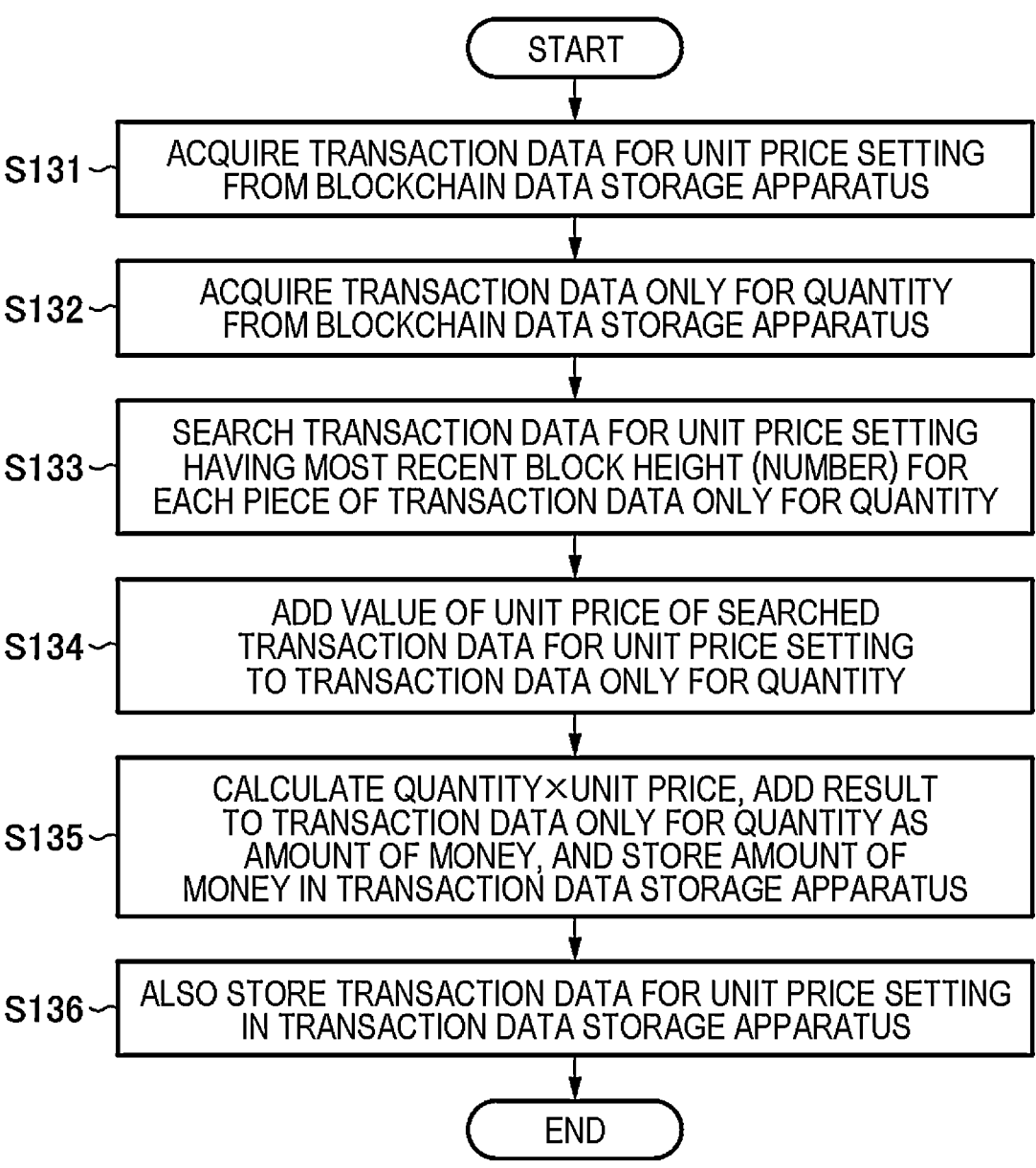
FIG. 21 is a flowchart illustrating a flow of processing of an amount calculation method for data in which a unit price and an amount of money are separately recorded is a transaction.

FIG. 21 is a flowchart illustrating a flow of processing of an amount calculation method for data in which a unit price and an amount of money are separately recorded in a transaction. Furthermore, FIG. 22 illustrates an example of transaction data that can be acquired by the API of the node software, and FIG. 23 illustrates an example of virtual transaction data obtained by performing the processing illustrated in FIG. 21 on the transaction data illustrated in FIG. 22.

In a case where data in which the unit price and the amount of money are recorded separately is set as an analysis target, the cryptographic asset blockchain processing apparatus 10 calculates the amount of money from the data, generates a virtual transaction in which the unit price, the quantity, and the amount of money are recorded, and stores the updated content recorded in the original data in the transaction data storage apparatus 172, for example, in the flow of processing as illustrated in FIG. 21. In this manner, the blockchain data stored in the blockchain data storage apparatus 171 can be converted into transaction data in an analyzable data format, that is, a data format in which a balance or the like for each address can be calculated, and the transaction data can be stored in the transaction data storage apparatus 172.

The flow of processing illustrated in FIG. 21 will be described with reference to an example of transaction data illustrated in FIGS. 22 and 23. First, the cryptographic asset blockchain processing apparatus 10 acquires transaction data for unit price setting (referred to as unit price transaction data) from the blockchain data storage apparatus 171 (step S131), and acquires transaction data for quantity designation (referred to as quantity transaction data) from the blockchain data storage apparatus 171 (step S132). In the example illustrated in FIG. 22, for example, the unit price transaction data is transactions with block heights of 500, 520, 540, and 541, which are block identification numbers, and the quantity transaction data is transactions with block heights of 510, 530, and 550.

After acquiring each piece of data, the cryptographic asset blockchain processing apparatus 10 searches unit price transaction data having the most recent block number for each piece of quantity transaction data (step S133), and adds the value of the unit price of the searched unit price transaction data to the quantity transaction data (step S134). For example, for a transaction having a block height of 510, when unit price transaction data having the most recent block height (number) is searched, a transaction having a block height of 500 is found (see FIG. 22), and the unit price (50) of the transaction is added to the transaction having a block height of 510 (see FIG. 23). Similarly, a unit price (100) of a transaction having a block height of 520 is added to a transaction having a block height of 530, and a unit price (110) of a transaction having a block height of 541 is added to a transaction having a block height of 550.

After adding the unit price recorded in the unit price transaction data to the quantity transaction data, the cryptographic asset blockchain processing apparatus 10 calculates an amount of money related to the transaction by multiplying the value of the quantity by the value of the unit price for each quantity transaction data (transactions with block heights of 510, 530, and 550 in FIG. 23) to which the unit price has been added, adds the amount of money to the transaction, and stores the amount of money in the transaction data storage apparatus (step S135). Similarly, the unit price transaction (transactions with block heights of 500, 520, 540, and 541 in FIG. 23) is also stored in the transaction data storage apparatus (step S136).

The user of the cryptographic asset blockchain processing system according to the present invention executes a command of data collection, data conversion (data processing), or the like by the cryptographic asset blockchain processing apparatus 10 at an arbitrary timing, so that the cryptographic asset blockchain processing apparatus 10 can comprehensively aggregate transaction data up to a certain time point, calculate the balance of the cryptographic asset of the participant in the transaction at the timing, create balance data (TSV format, CSV format, and the like) for each address (recording unit corresponding to the bank account number in the blockchain), and save the balance data in the transaction data storage apparatus 172.

As a method of calculating the balance for each address at a specific time point, for example, the cryptographic asset blockchain processing apparatus 10 can acquire ail transaction data matching from the genesis block to a specific block height from the transaction data storage apparatus 172, add the amounts of money of the acquired transaction data for each address, and store the transaction data in the transaction data storage apparatus 172. By using the transaction data stored in the transaction data storage apparatus 172, the cryptographic asset blockchain processing apparatus 10 can analyze the balance of the cryptographic asset or the like for each address for audit, for example. The user of the cryptographic asset blockchain processing system can arbitrarily extract the created transaction data and balance data, and can display the transaction data and balance data on a monitor or the like of the information processing terminal 20 to confirm the contents. In addition, the created transaction data and balance data can be further stored in another data storage apparatus or the like, and can be compared with a book record or the like obtained from a device other than the blockchain.

The cryptographic asset blockchain processing apparatus 10 can verify that blockchain data on the Internet is recorded without duplication or missing by using management information of transaction data periodically stored in the transaction data storage apparatus 172, and when an inconsistency occurs, an alert is generated and a user of the cryptographic asset blockchain processing system can be notified. For example, in a case where the inconsistency is detected, the cryptographic asset blockchain processing apparatus 10 can notify the information processing terminal 20 connected via the network N of an alert to notify the user of the alert.

Figure 24:
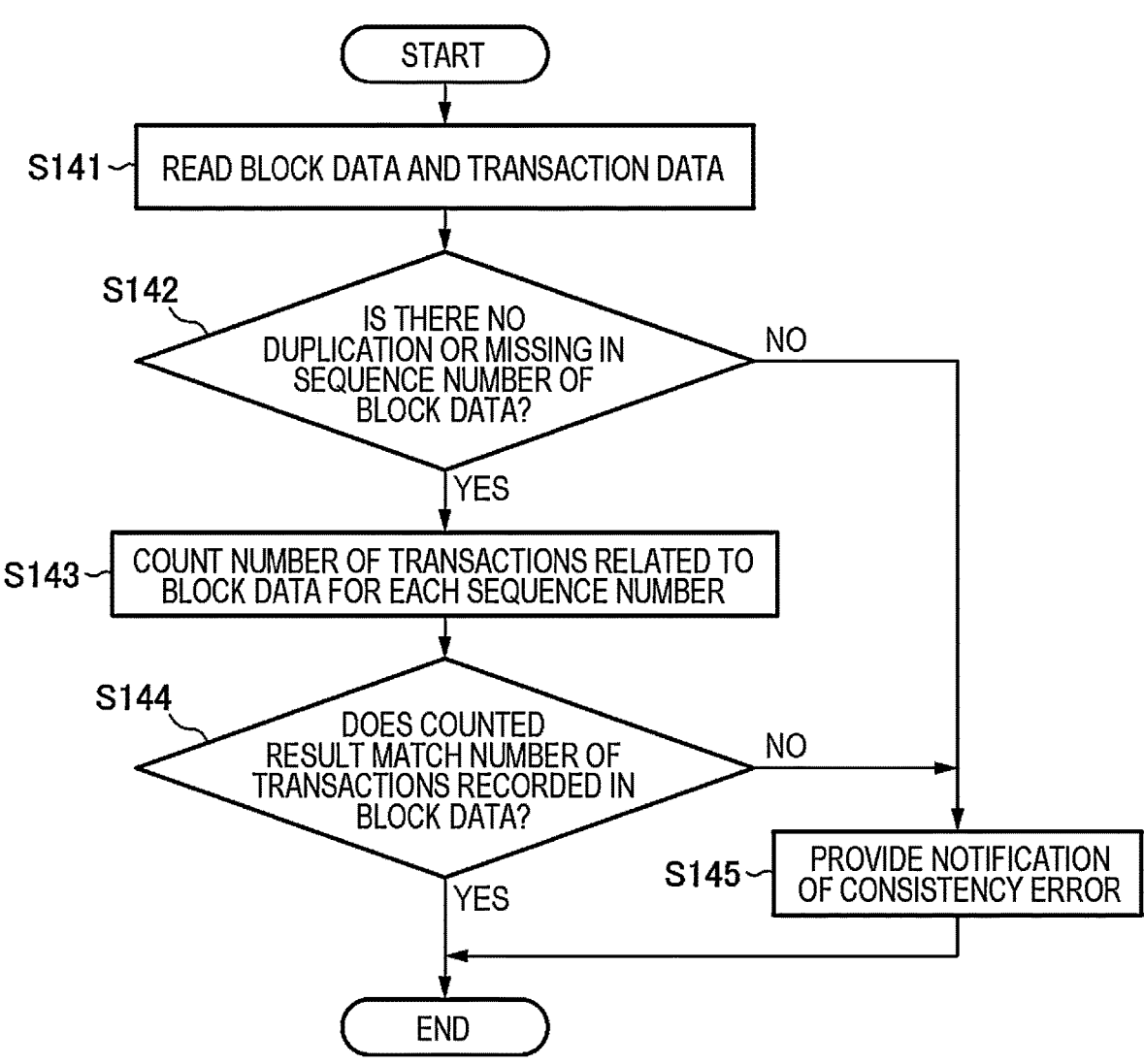
FIG. 24 is a flowchart illustrating a flow of processing of detecting duplication/missing of converted data (transaction data).
Figure 25:
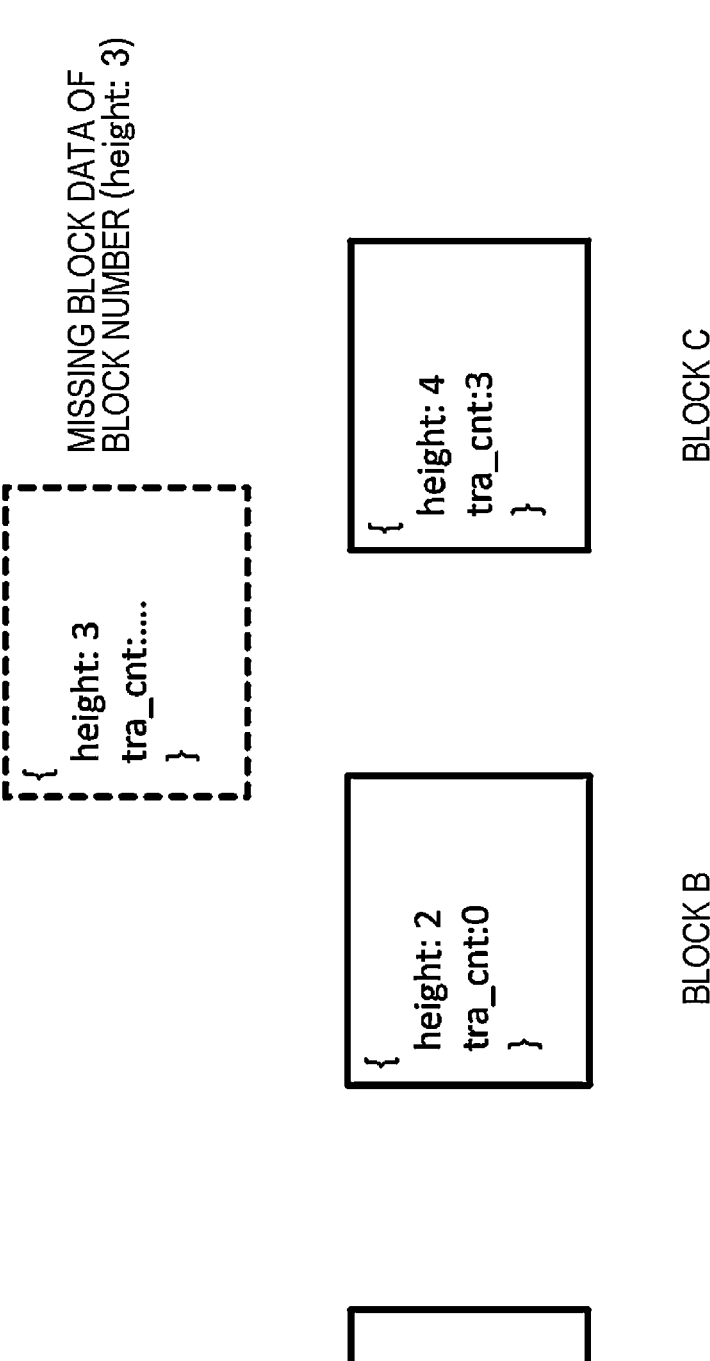
FIG. 25 is a diagram illustrating an example of missing of block data.
Figure 26:
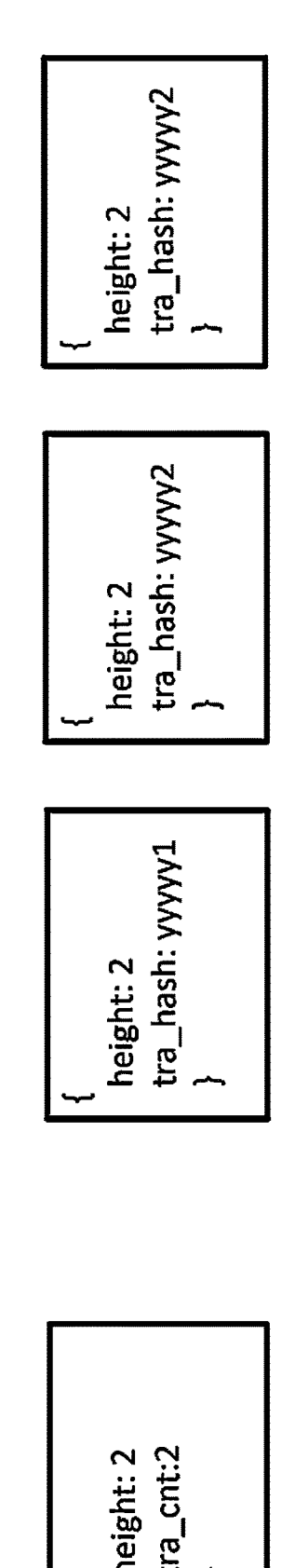
FIG. 26 is a diagram illustrating an example of duplication of transaction data.

FIG. 24 is a flowchart illustrating a flow of processing of detecting duplication/missing of converted data (that is, transaction data in a data format capable of calculating the balance or the like of the cryptographic asset). FIG. 25 illustrates an example of missing block data, and FIG. 26 illustrates an example of duplication of transaction data. The cryptographic asset blockchain processing apparatus 10 reads transaction data including block data, transaction data, and the like from a data storage apparatus (for example, transaction data storage apparatus 172) (step S141). Block data included in the transaction data is assigned with a serial number (sequence number) starting from 0 or 1 (genesis block number) in order of generation. The cryptographic asset blockchain processing apparatus 10 sequentially verifies whether there is no duplication or missing in the block number (sequence number) of the block data (step S142), and when there is duplication or missing (No in step S142), the cryptographic asset blockchain processing apparatus notifies the user of a consistency error (for example, via the information processing terminal 20,) providing notification that there is inconsistency in the blocks included in the transaction data (step S145).

For example, as illustrated in FIG. 25, the block data loss is a state in which block data with a block number of 3 is not stored in the data storage apparatus (for example, transaction data storage apparatus 172) when sequentially viewed from a block A to a block C with a block number (block height, height) 1.

When sequentially confirming the block A to the block C based on the block number, the cryptographic asset blockchain processing apparatus 10 can detect that the block data having the block number of 3 is missing.

In a case where there is no duplication or loss in the block data (Yes in step S142), the cryptographic asset blockchain processing apparatus 10 counts the number of transactions related to the block data for each sequence number by using the sequence number of the associated block in each of the transaction data (step S143), compares the counted result (the number of transactions) with the number of transactions recorded in the block data ("tra_cnt" in FIG. 26) (step S144), and in a case where there is a difference (in a case where there is no match) (No in step S144), notifies the user (for example, via the information processing terminal 20,) or a consistency error providing notification that there is an inconsistency in the transactions included in the transaction data (step S145).

For example, as illustrated in FIG. 26, the mismatch of the number of transactions is a state in which the number of transactions included in the block data with the block number (block height) of 2 (height: 2) is 2 (tra_cnt: 2), whereas the result of counting the number of transactions A, B, and C (the number of hashes of transactions (tra_hash)) related to the block data with the block number of 2 is 3.

Since the cryptographic asset blockchain processing apparatus 10 counts the transactions A, B, and C related to the block data (height: 2) for each block number and compares the counted result (in the example of FIG. 26, 3) with the number of transactions (tra_cnt) (in the example of FIG. 26, 2) recorded in the block data to obtain "number of transactions in block (tra_cnt) 2<number of hashes of transactions 3" as illustrated in FIG. 26, the cryptographic asset blockchain processing apparatus 10 can detect that the number of transactions (tra_cnt) recorded in the block data does not match the actual count result, that is, that there is duplication of the transaction data.

When the counted number of transactions matches the number of transactions (tra_cnt) recorded in the block data (Yes in step S144), the process of consistency verification of the transaction data is normally ended.

In addition to the process of inconsistency verification illustrated in FIG. 24, inconsistency can be detected on the basis of a balance of an address that is a recording unit corresponding to a bank account number in the cryptographic asset blockchain. For example, the cryptographic asset blockchain processing apparatus 10 calculates the balance of the designated address (for example, address randomly extracted the automatic collection mode (step S124 in FIG. 5)) using a block explorer managed and operated by a third party with high reliability.

Next, the balance obtained from the block explorer of the third party is compared with the balance of the same address calculated by the cryptographic asset blockchain processing apparatus 10, and in a case where the balances do not match, it is possible to notify the user that there is an inconsistency and store a message or the like indicating which address has been inconsistent in a specific folder. The message stored in the folder is, for example, as follows.

address, data_bricks balance, external_explorer balance, difference

1DFuBFLwJjXQapEBE36h3MmuHXMvjBUneA,701,
      600,101

1DFkMBvGTjUFJ621z1RkXjDBg1oJykniYL,117125,
      117124, 1

The message indicates that the balance (data_bricks balance) calculated by the cryptographic asset blockchain processing apparatus 10 and the balance (external_explorer) calculated using the block explorer of the third party do not match (difference) for the designated address (address).

Figure 27:
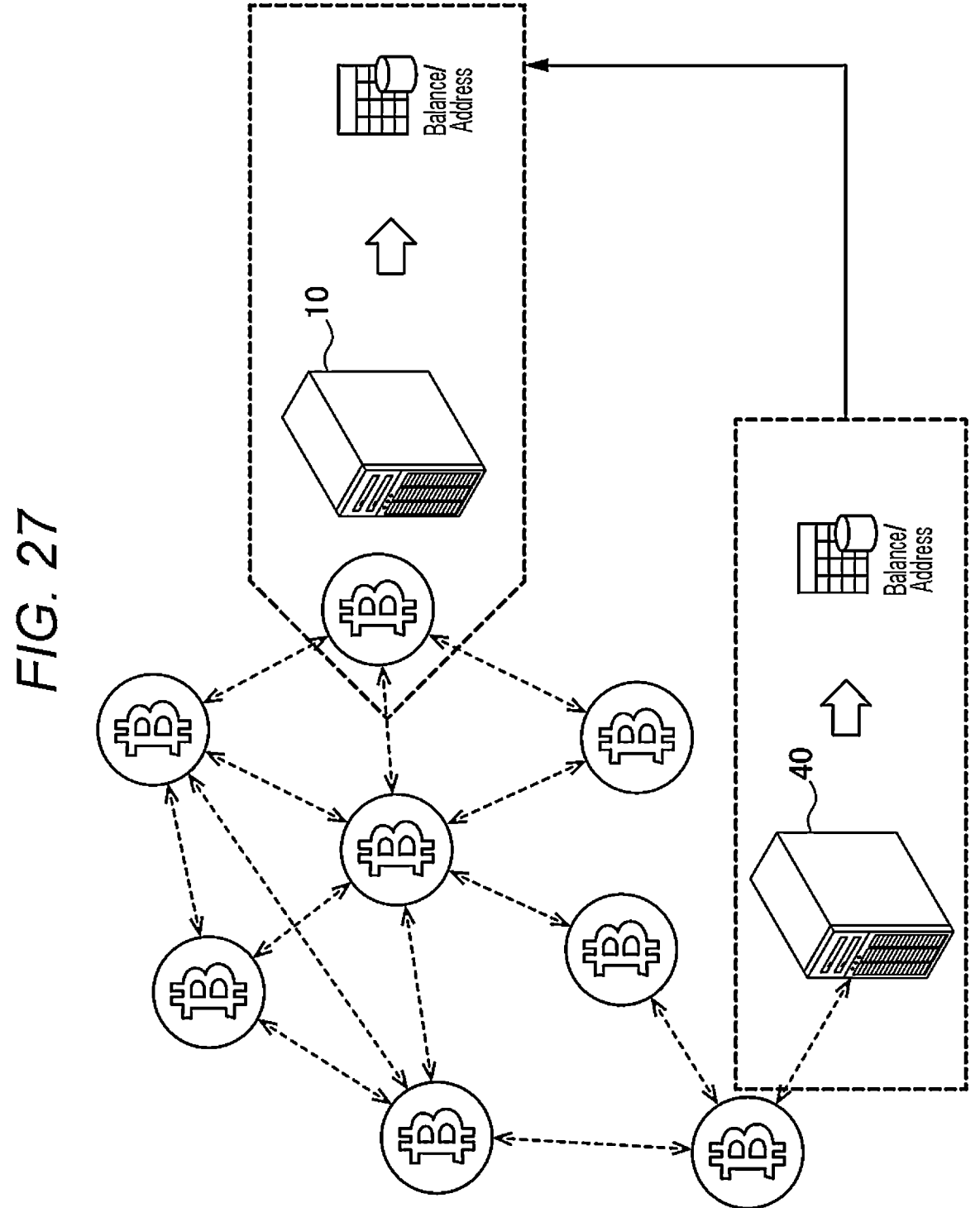
FIG. 27 is a schematic diagram illustrating a balance confirmation mechanism implemented by the cryptographic asset blockchain processing apparatus according to an embodiment of the present invention.

The balance confirmation mechanism via the block explorer of the third party can further improve reliability and objectivity of the calculation result provided by the cryptographic asset blockchain processing apparatus 10. FIG. 27 is a schematic diagram illustrating a balance confirmation mechanism implemented by the cryptographic asset blockchain processing apparatus according to an embodiment of the present invention.

The cryptographic asset blockchain processing apparatus 10 functions as a blockchain node to acquire blockchain data itself, and processes the blockchain data as described above to calculate a balance for each address. Meanwhile, the cryptographic asset blockchain processing apparatus 10 communicates with a host 40 of a block explorer managed and operated by a trusted third party. The cryptographic asset blockchain processing apparatus 10 requests the block explorer (host 40) for a balance of a randomly selected address. The block explorer transmits the requested balance to the cryptographic asset blockchain processing apparatus 10. The cryptographic asset blockchain processing apparatus 10 compares the balance obtained from the block explorer of the third party with the balance of the same address calculated by the cryptographic asset blockchain processing apparatus 10, and checks the consistency between them. This check may be performed periodically or in response to a request of the user.

The cryptographic asset blockchain processing apparatus 10 and the transaction data storage apparatus 172 can be operated, for example, in a cloud (for example, an in-house cloud) operating in a closed environment of a certain audit corporation. By operating in such a cloud, verification of transaction data and an address balance are processed in an environment isolated from the public Internet, and protection of confidential information of a client can be reliably ensured (on the other hand, when an API of a block explorer or the like is used, an address or transaction information needs to be queried on the Internet, and the query information is not protected).

In addition, by using the cloud technology, for example, the cryptographic asset blockchain processing apparatus 10 can be accessed from domestic or foreign firms (other audit corporations or the like) of the same group via a closed network of the audit corporation group. Since transactions of cryptographic assets are not affected by national borders, it is essential for fraudulent detection of transactions and the like to be able to access the same data by farms (audit corporations or the like) in each country belonging to the same group.

In general, implementation methods of various cryptographic assets are different, and implementation versions are frequently updated. For example, in a case where the implementation of the cryptographic asset is updated, it is necessary to change the processing content such as data collection according to the update content of the implementation method of the cryptocurrency for the cryptographic asset blockchain processing apparatus (node) corresponding to the implementation method of the cryptographic asset, and in order to ensure consistency of the blockchain data, it is necessary to make the node always compatible with the latest version.

However, the user is not necessarily notified of the update of the version or the node software or the cryptographic asset. This is because there is no management company that manages and maintains the cryptographic asset such as Bitcoin although this is a feature of the distributed blockchain in which the blockchain data is distributed in P2P and managed in each node. Instead, in practice, the version of the node software of the cryptographic asset is managed and maintained jointly by programmers who use the cryptographic asset (for example, a group of Bitcoin Core, or the like).

Generally, when and for what reason the version of the node software of the cryptographic asset is updated is often known from a chat or news. Acquiring update information of the version of the node software of the desired cryptographic asset individually from the chat or the news has a risk that the information is incomplete or the update itself is overlooked, and thus, the cryptographic asset blockchain processing system according to the present invention provides a cryptographic asset fork checker.

The cryptographic asset fork checker of the present invention is a mechanism that compares the version of the node software installed in the cryptographic asset blockchain processing apparatus 10 with the latest version of the node software managed by a site (Git Hub, Docker Hub, and the like) that manages the version of the node software, automatically creates a report, and issues an alert when there is a difference. Note that the fork refers to version update on the blockchain.

The cryptographic asset fork checker in the cryptographic asset blockchain processing system according to the present invention can automatically generate a report as illustrated in FIG. 28. FIG. 28 illustrates an example of a report automatically generated by comparing the version of the node software installed in the cryptographic asset blockchain processing apparatus 10 with the latest version of the node software managed by a third-party management site (Git Hub, Docker Hub, and the like). For each cryptographic asset, the cryptographic asset fork checker can compare a version of the node software of the cryptographic asset in the cryptographic asset blockchain processing system with a latest version of the node software recorded at a third-party management site (for example, GitHub, Docker Hub, and the like), and automatically generate a report describing a result of the comparison. Note that the version of the node software of the cryptographic asset recorded in GitHub, Docker Hub, or the like is always the latest.

As a result of the comparison, in a case where there is a difference between the version of the node software of the cryptographic asset in the cryptographic asset blockchain processing system and the version of the node software of the cryptographic asset recorded in the management site (GitHub, Docker Hub, and the like), for example, the cryptographic asset blockchain processing apparatus 10 can notify the information processing terminal 20 of an alert (inconsistency) to notify the user.

The items of the report illustrated in FIG. 28 are as follows.

TABLE 1

| | |
|---|---|
| Currency name | Name of cryptographic asset (virtual currency) |
| Current version (in CAPP2) | Version of node software of cryptographic asset currently supported by cryptographic asset blockchain processing system according to present invention |
| Current version date (in CAPP2) | Date when version of node software of cryptographic asset currently supported by cryptographic asset blockchain processing system according to present invention began to be used publicly |
| Latest version (in Github) | Version recorded on GitHub, which is one of sites that manages versions of node software |
| Latest version date (in Github) | Date when version on GitHub, which is one of sites that manages versions of node software, began to be used publicly |
| Need to Update? | Whether it needs to be updated |
| Reference | Reference data |
| Remarks | Comments |

In the example of the report illustrated in FIG. 28, in the node software of Bitcoin, Bitcoin Cash, and Ethereum/Ethereum Classic, the field of "Need to Update?" is "True", so that it is possible to notify the user that update is necessary via the information processing terminal 20 or the like.

As described above, the cryptographic asset blockchain processing apparatus or the like according to the present invention collects blockchain data (including blocks, transactions, and the like) of a cryptographic asset on an open network such as the Internet, accumulates the blockchain data for each type of the cryptographic asset in a computer (node) such as a server and a data storage apparatus under a private network environment in which a query or transaction information for a specific transaction is not intercepted by a third party, and converts the blockchain data into a data format suitable for analysis, so that it is possible not only to safely analyze the blockchain data and calculate a balance or the like for each address for audit but also to collect and analyze the blockchain data according to a plurality of different implementation methods of the cryptographic assets.

In addition, the cryptographic asset blockchain processing apparatus or the like according to the present invention generates virtual transaction data in which a transaction amount (=the unit price of the time when the transaction is performed×the transaction quantity) calculated from the unit price data and the transaction quantity data is recorded, in a case where information regarding the transaction quantity at the time when the transaction is performed and the unit price used for the transaction are recorded in different data records, depending on the implementation methods of the cryptographic assets, and thus, can comprehensively aggregate the transaction data up to a certain time point without being affected by the implementation methods of the cryptographic assets, and can easily calculate the balance of the cryptographic assets of the participants in the transaction at a specific time point sought in the past.

Furthermore, the cryptographic asset blockchain processing apparatus or the like according to the present invention can ensure consistency of transaction data to be analyzed by verifying duplication or missing of collected blockchain data, a difference in version of node software of the cryptographic asset, or the like.

INDUSTRIAL APPLICABILITY

The cryptographic asset blockchain processing apparatus or the like according to the present invention can be used, for example, in an audit corporation to calculate a balance of the cryptographic asset for each address to be audited and support the audit.

REFERENCE SIGNS LIST

10 Cryptographic asset blockchain processing apparatus (node)
10$a$ Node
10$b$ Node
11 CPU
12 Memory
13 Bus
14 Input/output interface
15 Input unit
16 Output unit
17 Storage unit
18 Communication unit
20 Information processing terminal
21 CPU
22 Memory
23 Bus
24 Input/output interface
25 Input unit
26 Output unit
27 Storage unit
28 Communication unit
30 Cloud storage
40 Host
111 Data collection unit
112 Data conversion unit
113 Data analysis unit
114 Consistency verification unit
171 Blockchain data storage apparatus
172 Transaction data storage apparatus
N Network

The invention claimed is:

1. A cryptographic asset blockchain processing apparatus, comprising:
  a memory; and
  a processor configured to access a cryptographic asset blockchain stored on a blockchain network and store in the memory a ledger of blockchain data synchronized from the cryptographic asset blockchain stored on the blockchain network based on a requested range of the blockchain data, convert the blockchain data into transaction data stored in the memory, and analyze the transaction data stored in the memory to determine a balance of a cryptographic asset for an address on the cryptographic asset blockchain.

2. The cryptographic asset blockchain processing apparatus according to claim 1, wherein the processor is configured to access the cryptographic asset blockchain in a static mode that designates a number of transaction data for each data batch and sets an end point of the requested range of the blockchain data, and set identification information of last transaction data of data collected last as a start point of the requested range.

3. The cryptographic asset blockchain processing apparatus according to claim 1, wherein the processor is configured to access the cryptographic asset blockchain in a dynamic mode that designates a data size for each data batch and sets an end point of the requested range, and set identification information of last transaction data of data collected last as a start point of the requested range.

4. The cryptographic asset blockchain processing apparatus according to claim 1, wherein the processor is configured to access the cryptographic asset blockchain in an automatic collection mode that acquires identification information of latest data on the cryptographic asset blockchain and sets the identification information as an end point of the requested range, and set identification information of last transaction data of data collected last as a start point of the requested range.

5. The cryptographic asset blockchain processing apparatus according to claim 4, wherein when a previous collection mode is a static mode in which a number of transaction data for each data batch is designated or a dynamic mode in which a data size for each data batch is designated, the processor is configured to recalculate identification information of last transaction data of data collected last time-based on a number of transaction data or a data size of the previous collection mode and set the identification information as a start point of the requested range.

6. The cryptographic asset blockchain processing apparatus according to claim 1, wherein the blockchain data includes transaction data to which an identifiable block number is assigned, the transaction data includes at least one or more pieces of unit price transaction data for unit price setting and one or more pieces of quantity transaction data for quantity designation, and
  the processor is configured to search, for each of the one or more pieces of quantity transaction data, unit price transaction data to which a block number closest to a block number assigned to the one or more pieces of quantity transaction data is assigned, and calculate an amount of money related to a transaction by multiplying a value of a unit price of the unit price transaction data searched by a quantity of the one or more pieces of quantity transaction data.

7. The cryptographic asset blockchain processing apparatus according to claim 6, wherein the memory includes a blockchain data storage apparatus and a transaction data storage apparatus, the blockchain data collected by the processor is stored in the blockchain data storage apparatus, and transaction data including the amount of money calculated by the processor is stored in the transaction data storage apparatus.

8. The cryptographic asset blockchain processing apparatus according to claim 7, wherein the processor is configured to acquire the transaction data matching a block number from a first block number to a block number at a specific time point from the transaction data storage apparatus, and caluclate a balance by adding an amount of money of the transaction data acquired for each address that is a recording unit corresponding to a bank account number in the cryptographic asset blockchain.

9. The cryptographic asset blockchain processing apparatus according to claim 1, wherein the blockchain data includes at least block data and transaction data, the processor is configured to add an attribute of at least one of a year, a month, and a date related to a transaction date and time to each of the block data and the transaction data to convert the block data and the transaction data into transaction data distinguishable by the at least one of the year, the month, and the date, and the transaction data is classified by the at least one of the year, the month, and the date and stored in the memory.

10. The cryptographic asset blockchain processing apparatus according to claim 9, wherein the memory includes a blockchain data storage apparatus and a transaction data storage apparatus, the blockchain data collected by the processor is stored in the blockchain data storage apparatus, and the transaction data to which the attribute of the at least one of the year, the month, and the date is added by the processor and which can be distinguished by the at least one of the year, the month, and the date is stored in the transaction data storage apparatus.

11. The cryptographic asset blockchain processing apparatus according to claim 6, wherein the processor is configured to divide the transaction data into transaction input data and transaction output data, and calculate total revenue and total expenditure in a range of a specific block number based on the transaction input data and the transaction output data for each address that is a recording unit corresponding to a bank account number in the cryptographic asset blockchain.

12. The cryptographic asset blockchain processing apparatus according to claim 6, wherein the processor is configured to calculate a balance for each address based on the transaction data and a result of a smart contract for each address that is a recording unit corresponding to a bank account number in the cryptographic asset blockchain.

13. The cryptographic asset blockchain processing apparatus according to claim 1, wherein the transaction data includes block data to which a sequence number is assigned in a generation order, the processor is configured to determine whether the sequence number is duplicated or missing by sequentially collating the sequence number of the block data, and in response to determining there is a duplication or missing in the sequence number, output a notification of inconsistency of the block data corresponding to the sequence number.

14. The cryptographic asset blockchain processing apparatus according to claim 13, wherein the processor is configured to count a number of transaction data for each sequence number with respect to transaction data having a sequence number of a belonging block, and compare the number of transaction data with a number of transactions recorded in block data to which the sequence number is assigned, and output a notification of an inconsistency of the block data in a response to a result of a comparison indicating a difference between the number of transaction data with the number of transactions recorded in block data to which the sequence number is assigned.

15. The cryptographic asset blockchain processing apparatus according to claim 8, wherein the processor is configured to calculate a verification balance of an address designated by a user using a block explorer managed by a third party, acquire a balance at the address designated from a balance calculated for each address, and compare the balance calculated by the processor with the verification balance, and output a notification that there is an inconsistency in data of the address designated in response to a result of a comparison indicating a difference between the balance and the verification balance.

16. The cryptographic asset blockchain processing apparatus according to claim 13, wherein the processor is configured to access a site that manages a version of node software of a cryptographic asset, check a latest version of node software of a cryptographic asset, compare the latest version with a version of node software of the cryptographic asset stored in the memory, and output a notification that there is an inconsistency in the version of the node software of the cryptographic asset in response to a result of a comparison indicating a difference between the latest version and the version.

17. A cryptographic asset blockchain processing method comprising:

accessing a cryptographic asset blockchain stored on a blockchain network:

storing in a memory of a cryptographic asset blockchain processing apparatus a ledger of blockchain data synchronized from the cryptographic asset blockchain stored on the blockchain network based on a requested range of the blockchain data; and converting the blockchain data into transaction data stored in the memory; and analyzing the transaction data stored in the memory to determine a balance of a cryptographic asset for an address on the cryptographic asset blockchain.

18. A cryptographic asset blockchain processing system comprising:

the cryptographic asset blockchain processing apparatus according to claim 1; and an information processing terminal, wherein the cryptographic asset blockchain processing apparatus and the information processing apparatus are connected via a local network.

* * * * *